United States Patent
Arora et al.

(10) Patent No.: US 10,419,540 B2
(45) Date of Patent: Sep. 17, 2019

(54) ARCHITECTURE FOR INTERNET OF THINGS

(71) Applicant: Microsoft Technology Licensing, LLC, Redmond, WA (US)

(72) Inventors: Pankaj S. Arora, Kirkland, WA (US); Joshua M. Davis, Redmond, WA (US); Kyle K. Getty, Bellevue, WA (US); Aaron L. Mumm, Kirkland, WA (US); Lynn Kepl, Woodinville, WA (US); Kimberly D. A. Hallman, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 118 days.

(21) Appl. No.: 15/233,098

(22) Filed: Aug. 10, 2016

(65) Prior Publication Data
US 2017/0099353 A1    Apr. 6, 2017

Related U.S. Application Data

(60) Provisional application No. 62/237,478, filed on Oct. 5, 2015.

(51) Int. Cl.
*H04L 29/08* (2006.01)
*H04W 4/70* (2018.01)

(52) U.S. Cl.
CPC ............. *H04L 67/12* (2013.01); *H04L 67/10* (2013.01); *H04L 67/22* (2013.01); *H04W 4/70* (2018.02)

(58) Field of Classification Search
CPC .......... H04L 67/12; H04L 67/22; H04L 67/10
USPC ......................................................... 709/224
See application file for complete search history.

(56) References Cited

U.S. PATENT DOCUMENTS

| | | | |
|---|---|---|---|
| 5,971,597 A | 10/1999 | Baldwin et al. |
| 6,796,187 B2 | 9/2004 | Srinivasan et al. |
| 6,909,921 B1 | 6/2005 | Bilger |
| 7,446,694 B1 | 11/2008 | Ahmed et al. |
| 7,847,699 B2 | 12/2010 | Lee et al. |
| 8,050,881 B1 | 11/2011 | Yeung et al. |
| 8,886,744 B1 | 11/2014 | Pabla |
| 9,325,792 B2 | 4/2016 | Hallman et al. |

(Continued)

FOREIGN PATENT DOCUMENTS

| | | |
|---|---|---|
| CN | 102355682 A | 2/2012 |
| CN | 102570535 A | 7/2012 |

(Continued)

OTHER PUBLICATIONS

Wang et al., "A Framework of Energy Efficient Mobile Sensing for Automatic User State Recognition", 7th International Conference on Mobile Systems, Mobile Sensing and Inference, MobiSys 2009, Jun. 22, 2009, pp. 179-192, 14 pages.

(Continued)

*Primary Examiner* — Michael Won
(74) *Attorney, Agent, or Firm* — Rainier Patents, P.S.

(57) ABSTRACT

The description relates to managing physical locations with IoT devices. One example can include a sensor array assembly comprising an enclosure and a mounting element. The mounting element can include multiple apertures spaced at different distances from the enclosure. The sensor array assembly can also include a connector that is receivable by individual apertures.

20 Claims, 21 Drawing Sheets

(56) References Cited

U.S. PATENT DOCUMENTS

| | | | |
|---|---|---|---|
| 9,985,946 B2* | 5/2018 | Smith | H04L 9/3255 |
| 10,069,781 B2* | 9/2018 | Kumar | H04L 51/18 |
| 2003/0074088 A1 | 4/2003 | Gonzalez et al. | |
| 2003/0201929 A1 | 10/2003 | Lutter et al. | |
| 2003/0233155 A1 | 12/2003 | Slemmer et al. | |
| 2004/0121882 A1 | 6/2004 | Tajima et al. | |
| 2004/0212677 A1 | 10/2004 | Uebbing | |
| 2006/0087286 A1 | 4/2006 | Phillips et al. | |
| 2006/0136759 A1 | 6/2006 | Koo | |
| 2007/0043803 A1 | 2/2007 | Whitehouse et al. | |
| 2007/0150565 A1 | 6/2007 | Ayyagari et al. | |
| 2007/0229032 A1 | 10/2007 | Elder et al. | |
| 2007/0268506 A1* | 11/2007 | Zeldin | H04L 41/0806 358/1.13 |
| 2008/0206627 A1 | 8/2008 | Wright | |
| 2008/0234935 A1 | 9/2008 | Wolf et al. | |
| 2009/0055691 A1 | 2/2009 | Ouksel et al. | |
| 2009/0319569 A1 | 12/2009 | Parks | |
| 2009/0325044 A1 | 12/2009 | Rajpara et al. | |
| 2010/0039284 A1 | 2/2010 | Hall et al. | |
| 2010/0074157 A1 | 3/2010 | Doh et al. | |
| 2010/0082198 A1 | 4/2010 | Arai et al. | |
| 2010/0138093 A1 | 6/2010 | Oku et al. | |
| 2010/0182157 A1 | 7/2010 | Shaffer | |
| 2011/0050417 A1 | 3/2011 | Piccioni | |
| 2011/0068746 A1 | 3/2011 | Rocci | |
| 2011/0074596 A1 | 3/2011 | Frohlick et al. | |
| 2011/0216660 A1 | 9/2011 | Lee et al. | |
| 2011/0254760 A1 | 10/2011 | Lloyd et al. | |
| 2012/0101755 A1 | 4/2012 | Hirasawa | |
| 2012/0163520 A1 | 6/2012 | Liu et al. | |
| 2012/0203491 A1 | 8/2012 | Sun et al. | |
| 2012/0254878 A1 | 10/2012 | Nachman et al. | |
| 2012/0299721 A1 | 11/2012 | Jones | |
| 2013/0057394 A1 | 3/2013 | Andiappan et al. | |
| 2013/0124712 A1* | 5/2013 | Parker | H04L 41/5038 709/224 |
| 2013/0158928 A1 | 6/2013 | Hogdal | |
| 2013/0259456 A1 | 10/2013 | Viswanathan | |
| 2014/0128994 A1 | 5/2014 | Hallman et al. | |
| 2014/0129162 A1 | 5/2014 | Hallman et al. | |
| 2014/0207282 A1 | 7/2014 | Angle et al. | |
| 2015/0019710 A1 | 1/2015 | Shaashua et al. | |
| 2015/0067119 A1* | 3/2015 | Estevez | H04L 67/12 709/223 |
| 2015/0121470 A1* | 4/2015 | Rongo | H04W 4/70 726/4 |
| 2015/0127300 A1 | 5/2015 | Bluming et al. | |
| 2015/0127983 A1* | 5/2015 | Trobough | G06F 11/267 714/30 |
| 2015/0134801 A1* | 5/2015 | Walley | H04L 43/50 709/223 |
| 2015/0180723 A1* | 6/2015 | Kuo | H04L 41/5041 709/223 |
| 2015/0256433 A1* | 9/2015 | Sum | G01R 25/00 709/224 |
| 2016/0105305 A1* | 4/2016 | Pignataro | H04L 67/32 709/223 |
| 2016/0139576 A1* | 5/2016 | Aiken | G05B 15/02 700/276 |
| 2016/0253848 A1* | 9/2016 | Taniguchi | G07B 15/02 705/13 |
| 2016/0277530 A1* | 9/2016 | Jung | H04W 4/70 |
| 2016/0344569 A1* | 11/2016 | Chun | G06F 3/04842 |
| 2016/0359697 A1* | 12/2016 | Scheib | H04L 63/1425 |
| 2017/0085390 A1* | 3/2017 | Belveal | H04W 4/70 |
| 2017/0161004 A1* | 6/2017 | Lee | H04W 4/70 |
| 2017/0195136 A1* | 7/2017 | Ghosh | H04L 12/66 |
| 2017/0289271 A1* | 10/2017 | Seed | H04L 67/34 |
| 2018/0139569 A1* | 5/2018 | Padgett | H04W 4/80 |

FOREIGN PATENT DOCUMENTS

| | | |
|---|---|---|
| CN | 102715887 A | 10/2012 |
| CN | 203465576 U | 3/2014 |
| CN | 103795617 A | 5/2014 |
| CN | 204005601 U | 12/2014 |
| CN | 204009559 U | 12/2014 |
| CN | 204013914 U | 12/2014 |
| CN | 204069012 U | 12/2014 |
| CN | 103105611 B | 1/2016 |
| EP | 1517493 A2 | 3/2005 |
| EP | 2866384 A1 | 4/2015 |
| WO | 2001099078 A2 | 12/2001 |
| WO | 2007102668 A4 | 9/2007 |
| WO | 2012119253 A1 | 9/2012 |
| WO | 2016022018 A1 | 2/2016 |

OTHER PUBLICATIONS

Zhu et al., "Low-Power Distributed Even Detection in Wireless Sensor Networks", 26th IEEE International Conference on Comp. Comm., INFOCOM 2007, May 6, 2007, pp. 2401-2405, 5 pages.

Zilan et al., "Available Mote Platforms for Wireless Image Sensors", Technical Report UPC-DAC-RR-XCSD-2008-4, retrieved at <<https://www.ac.upc.edu/app/research-reports/html/2008/9/Motes.pdf>>, Sep. 2008, 23 pages.

Non-Final Office Action dated Mar. 20, 2015 from U.S. Appl. No. 13/670,633, 21 pages.

Response filed Jun. 19, 2015 to the Non-Final Office Action dated Mar. 20, 2015 from U.S. Appl. No. 13/670,633, 14 pages.

Final Office Action dated Sep. 8, 2015 from U.S. Appl. No. 13/670,633, 12 pages.

Response filed Dec. 3, 2015 to the Final Office Action dated Sep. 8, 2015 from U.S. Appl. No. 13/670,633, 17 pages.

Non-Final Office Action dated Jan. 6, 2016 from U.S. Appl. No. 13/670,633, 11 pages.

Response filed Apr. 6, 2016 to the Non-Final Office Action dated Jan. 6, 2016 from U.S. Appl. No. 13/670,633, 17 pages.

Final Office Action dated Jul. 22, 2016 from U.S. Appl. No. 13/670,633, 14 pages.

International Search Report and Written Opinion dated Feb. 13, 2014 from PCT Patent Application No. PCT/US2013/068969, 12 pages.

International Preliminary Report on Patentability dated May 21, 2015 from PCT Patent Application No. PCT/US2013/068969, 9 pages.

First Office Action and Search Report dated Jun. 3, 2016 from Chinese Patent Application No. 201380058380.8, 17 pages.

Communication pursuant to 94(3) EPC dated Aug. 29, 2016 from European Patent Application No. 13795375.8, 6 pages.

Response filed Sep. 30, 2016 to the Communication pursuant to 94(3) EPC dated Aug. 29, 2016 from European Patent Application No. 13795375.8, 9 pages.

Non-Final Office Action dated Sep. 29, 2014 from U.S. Appl No. 13/671,370, 23 pages.

Response filed Nov. 17, 2014 to the Non-Final Office Action dated Sep. 29, 2014 from U.S. Appl. No. 13/671,370, 17 pages.

Final Office Action dated Dec. 4, 2014 from U.S. Appl. No. 13/671,370, 15 pages.

Response filed Mar. 19, 2015 to the Final Office Action dated Dec. 4, 2014 from U.S. Appl. No. 13/671,370, 18 pages.

Non-Final Office Action dated Jun. 7, 2015 from U.S. Appl. No. 13/671,370, 22 pages.

Response filed Nov. 17, 2015 to the Non-Final Office Action dated Jun. 17, 2015 from U.S. Appl. No. 13/671,370, 19 pages.

Notice of Allowance dated Jan. 5, 2016 from U.S. Appl. No. 13/671,370, 5 pages.

International Search Report and Written Opinion dated Feb. 25, 2014 from PCT Patent Application No. PCT/US2013/069000, 11 pages.

International Preliminary Report on Patentability dated May 21, 2015 from PCT Patent Application No. PCT/US2013/069000, 8 pages.

(56) References Cited

OTHER PUBLICATIONS

Non-Final Office Action dated Sep. 15, 2015 from U.S. Appl. No. 13/671,260, 42 pages.
Response filed Dec. 15, 2015 to the Non-Final Office Action dated Sep. 15, 2015 from U.S. Appl. No. 13/671,260, 18 pages.
Final Office Action dated Mar. 29, 2016 from U.S. Appl. No. 13/671,260, 25 pages.
Response filed Apr. 28, 2016 to the Final Office Action dated Mar. 29, 2016 from U.S. Appl. No. 13/671,260, 16 pages.
Non-Final Office Action dated Jul. 5, 2016 from U.S. Appl. No. 13/671,260, 27 pages.
Response filed Sep. 12, 2016 to the Non-Final Office Action dated Jul. 5, 2016 from U.S. Appl. No. 13/671,260, 20 pages.
International Search Report and Written Opinion dated Oct. 6, 2014 from PCT Patent Application No. PCT/US2013/068988, 11 pages.
Article 34 Amendment filed Jan. 6, 2015 from PCT Patent Application No. PCT/US2013/068988, 11 pages.
Second Written Opinion dated Feb. 23, 2015 from PCT Patent Application No. PCT/US2013/068988, 6 pages.
International Preliminary Report on Patentability dated Dec. 15, 2015 from PCT Patent Application No. PCT/US2013/068988, 7 pages.
First Office Action and Search Report dated Jul. 6, 2016 from Chinese Patent Application No. 201380058393.5, 11 pages.
Communication pursuant to Rules 161(1) and 162 EPC dated Jun. 16, 2015 from European Patent Application No. 13795114.1, 2 pages.
Response filed Dec. 16, 2015 to the Communication pursuant to Rules 161(1) and 162 dated Jun. 16, 2015 from European Patent Application No. 13795114.1, 14 pages.
Bluming et al., U.S. Appl. No. 61/899,261, "Sensor Fusion for Virtual Sensors", filed Nov. 3, 2013, by Inventors Bluming et al., 24 pages.
International Search Report and Written Opinion dated Jan. 29, 2015 from PCT Patent Application No. PCT/US2014/063612, 11 pages.
Response filed May 21, 2015 to the International Search Report and Written Opinion dated Jan. 29, 2015 from PCT Patent Application No. PCT/US2014/063612, 9 pages.
Second Written Opinion dated Aug. 19, 2015 from PCT Patent Application No. PCT/US2014/063612, 6 pages.
International Preliminary Report on Patentability dated Nov. 10, 2015 from PCT Patent Application No. PCT/US2014/063612, 7 pages.
Communication pursuant of Rule 161(1) and 162 EPC dated Aug. 2, 2016 from European Patent Application No. 14802275.9, 2 pages.
Response filed Sep. 6, 2016 to the Communication pursuant of Rule 161(1) and 162 EPC dated Aug. 2, 2016 from European Patent Application No. 14802275.9, 17 pages.
Response dated Oct. 24, 2016 to the Final Office Action dated Jul. 22, 2016 from U.S. Appl. No. 13/670,633, 17 pages.
International Preliminary Report on Patentability dated Jun. 18, 2015 from PCT Patent Application No. PCT/US2013/068988, 8 pages.
Alaei et al., "Node Clustering Based on Overlapping FoVs for Wireless Multimedia Sensor Networks", 2010 IEEE Wireless Communications and Networking Conference, Sydney, Australia, Apr. 18, 2010, pp. 1-6, 6 pages.
Analog Devices, Inc., "Integrated Precision Battery Sensor for Automotive", ADUC7034 Data Sheet, May 2010, retrieved at <<http://www.analog.com/static/imported-files/data_sheets/ADuC70367.pdf>>, 140 pages.
Angelsmark, Ola, "A closer look at Calvin", retrieved at <<http://www.ericsson.com/research-blog/cloud/closer-look-calvin/#more-2417>>, Jul. 2, 2015, 11 pages.
Apple Computers, Inc., "Nike + iPod: About the sensor battery", Apple support, retrieved at <<http://support.apple.com/kb/HT1400, Jan. 20, 2010, 2 pages.

Argus Analyzers, "Automotive Battery Monitoring System", retrieved at <<http://www.argusanalyzers.com/embedded-battery-sensors/automotive-sensors.html>>, May 14, 2012, 2 pages.
Bai et al., "Design and Implementation of a Home Embedded Surveillance System with Ultra-Low Alert Power", IEEE Transactions on Consumer Electronics, vol. 57, Issue 1, Feb. 1, 2011, pp. 153-159, 7 pages.
Boice et al., "Meerkats: A Power-Aware, Self-Managing Wireless Camera Network for Wide Area Monitoring", Distributed Smart Cameras Workshop—Sensys06, Technical Report UCSC-CRL-05-04, Oct. 2006, 13 pages.
Brashear et al., "Using Multiple Sensors for Mobile Sign Language Recognition", Proceeding of the Seventh IEEE International Symposium on Wearable Computers, ISWC 2003, Oct. 21, 2003, pp. 45-52, 8 pages.
Crowley et al., "Leveraging Social Media and IoT to Bootstrap Smart Environments", Big Data and Internet of Things: A Roadmap for Smart Environments, Mar. 12, 2014, pp. 379-399, 21 pages.
"Data Utilization + Eye Tracking Technology + Robotics", retrieved at <<http://www.beyonddesignchicago.com/data-utilization-eye-tracking-technology-robotics/>>, Jan. 23, 2014, 8 pages.
Delphi Corp., "Delphi IVT Battery Sensor", retrieved at <<http://delphi.com/shared/pdf/ppf/sensors/et_ivt.pdf>>, Mar. 27, 2008, 1 page.
EE Times Asia, "Smart battery sensor tagets auto, industrial, medical batteries", retrieved at <<http://www.eetasia.com/ART_8800666960_765245_NP_7bdae7b1.HTM>>, May 15, 2012, 2 pages.
Fiware Forge Wiki, "FI-WARE Internet of Things (IoT) Services Enablement", captured by the Internet archive at <<http://web.archive.org/web/20150612061749/http://forge.fiware.org/plugins/mediawiki/wiki/fiware/index.php/FI-WARE_Internet_of_Things_(IoT)_Services_Enablement>>, Jun. 12, 2015, 26 pages.
Freescale, "Transformation of Sensing to Address the Expanding Contextual World", retrieved at <<http://www.mouser.com/pdfdocs/ Freescale-Transformation-of-Sensing-to-Address-the-Expanding-Contextual-World.pdf>>, 2012, 7 pages.
Hella Electronics Corp., "Intelligent battery sensors", retrieved at >>http://www.hella.nl/produktion/HellaNL/WebSite/MiscContent/Download/Automobilindustrie/Booklets_Flyer/ELO_Ids_Flyer.pdf>, May 2007, 2 pages.
Hilton, Steve, "How IoT Affects Your Enterprise", retrieved at <<http://www.networkcomputing.com/data-centers/how-iot-affects-your-enterprise/a/d-id/1316056>>, Sep. 25, 2014, 12 pages.
Kaempchen et al., "Data Synchronization Strategies for Multi-Sensor Fusion", IEEE Conference on Intelligent Transportation System, Oct. 12, 2003, 9 pages.
Kionix, "Sensor Fusion", retrieved at <<http://www.kionix.com/sensor-fusion>>, Jun. 25, 2012, 5 pages.
Lichtenauer et al., "Cost-Effective Solution to Synchronized Audio-Visual Capture using Multiple Sensors", IEEE Conference on Advanced Video and Signal Based Surveillance, Sep. 2, 2009, pp. 324-329, 6 pages.
Margi et al., "Characterizing Energy Consumption in a Visual Sensor Network Testbed", 2nd International Conference on Testbeds & Research Infrastructures for the Development of Networks & Communities, TRIDENTCOM 2006, Mar. 1, 2006, pp. 331-339, 8 pages.
Margi et al., "Energy Consumption Tradeoffs in Visual Sensor Networks", 24th Brazilian Symposium on Comp. Networks, SBRC 2006, Jun. 2006, 16 pages.
Movea, Inc., "Low-Power Embedded MEMS Motion Processing for Mobile Applications", retrieved at <<http://www.movea.com/news-and-media/in-the-news/434-ee-times-microwave-low-power-embedded-mems-motion-processing-for-mobile-applications>>, Oct. 28, 2012, 6 pages.
Movea, Inc., "Motion MEMS Smart multi-axis solutions for enhanced user experience", retrieved at <<http://www.st.com/st-web/ui/static/active/cn/resource/sales_and_marketing/promotional_material/brochure/brmems.pdf>>, May 2013, 20 pages.
Nilsson et al., "Time Synchronization and Temporal Ordering of Asynchronous Sensor Measurements of a Multi-sensor Navigation System", IEEE/ION Position Location and Navigation Symposium, May 4, 2010, 6 pages.

(56) References Cited

OTHER PUBLICATIONS

Persson et al., "Calvin—Merging Cloud and IoT", 6th International Conference on Ambient Systems, Networks and Technologies, Jun. 2, 2015, pp. 210-217, 8 pages.

Perssson, Joakim, "Open Source release of IoT app environment Calvin", retrieved at <<http://www.ericsson.com/research-blog/cloud/open-source-calvin/>>, Jun. 4, 2015, 10 pages.

Primal Cortex's Weblog, "IoT device provisioning and tracking", retrieved at <<https://primalcortex.wordpress.com/2015/10/14/iot-device-provisioning-and-tracking/>>, Oct. 14, 2015, 17 pages.

Priyantha et al., "EERS: Energy Efficient Responsive Sleeping on Mobile Phones", retrieved at <<http://sensorlab.cs.dartmouth.edu/phonesense/papers/Priyantha-EERS.pdf>>, Nov. 2010, 5 pages.

Sentral, "For unparalleled sensor fusion that consumes only 1% as much power as other processors", retrieved at <<http://www.sensorsmag.com/sensors-expo/em-microelectronic>>, Mar. 4, 2012, 4 pages.

Shih et al., "Wake on Wireless: An Event Driven Energy Saving Strategy for Battery Operated Devices", 8th Annual International Conference on Mobile Computing and Networking, MOBICOM 2002, Sep. 23, 2002, pp. 160-171, 12 pages.

\* cited by examiner

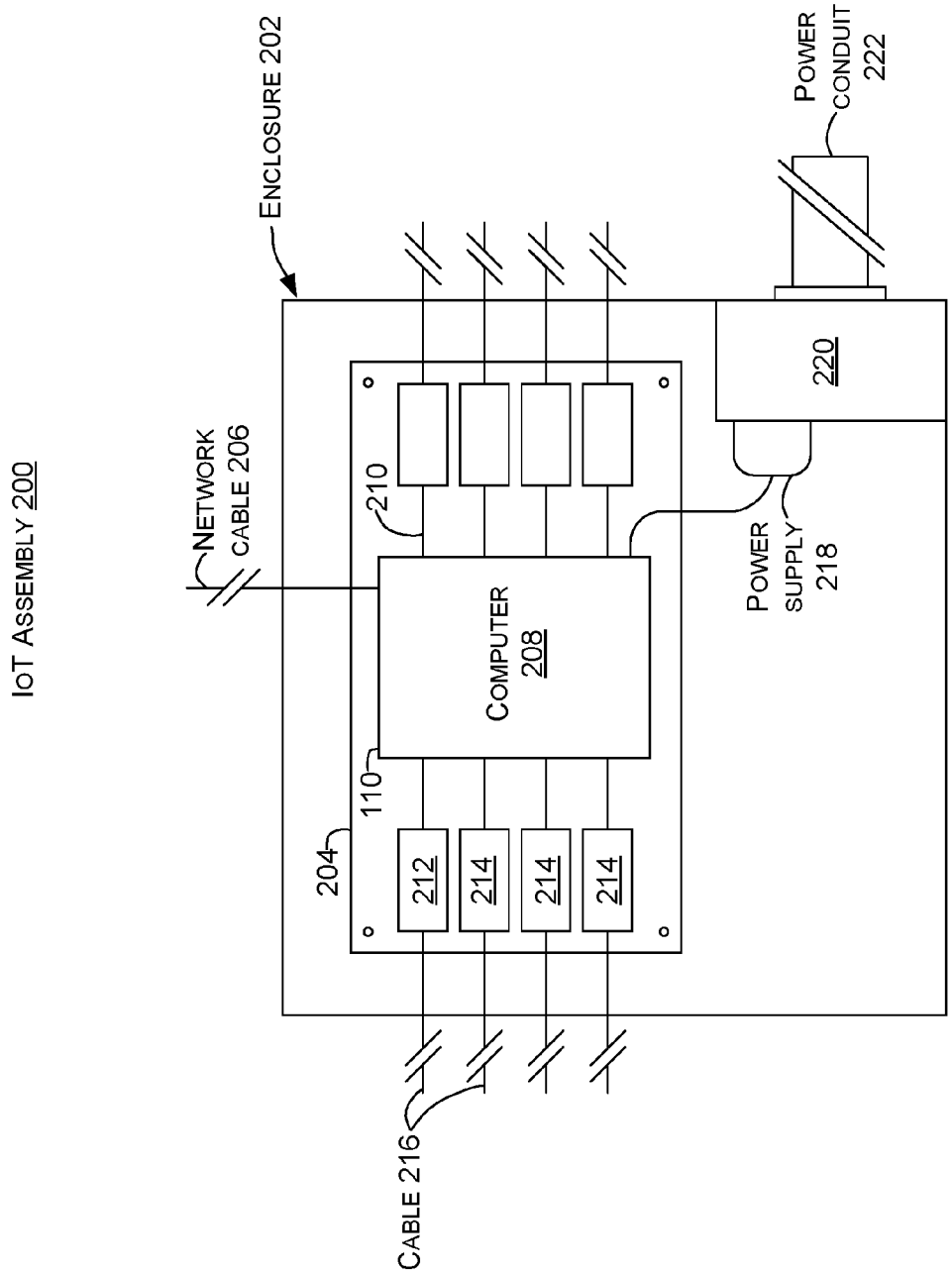

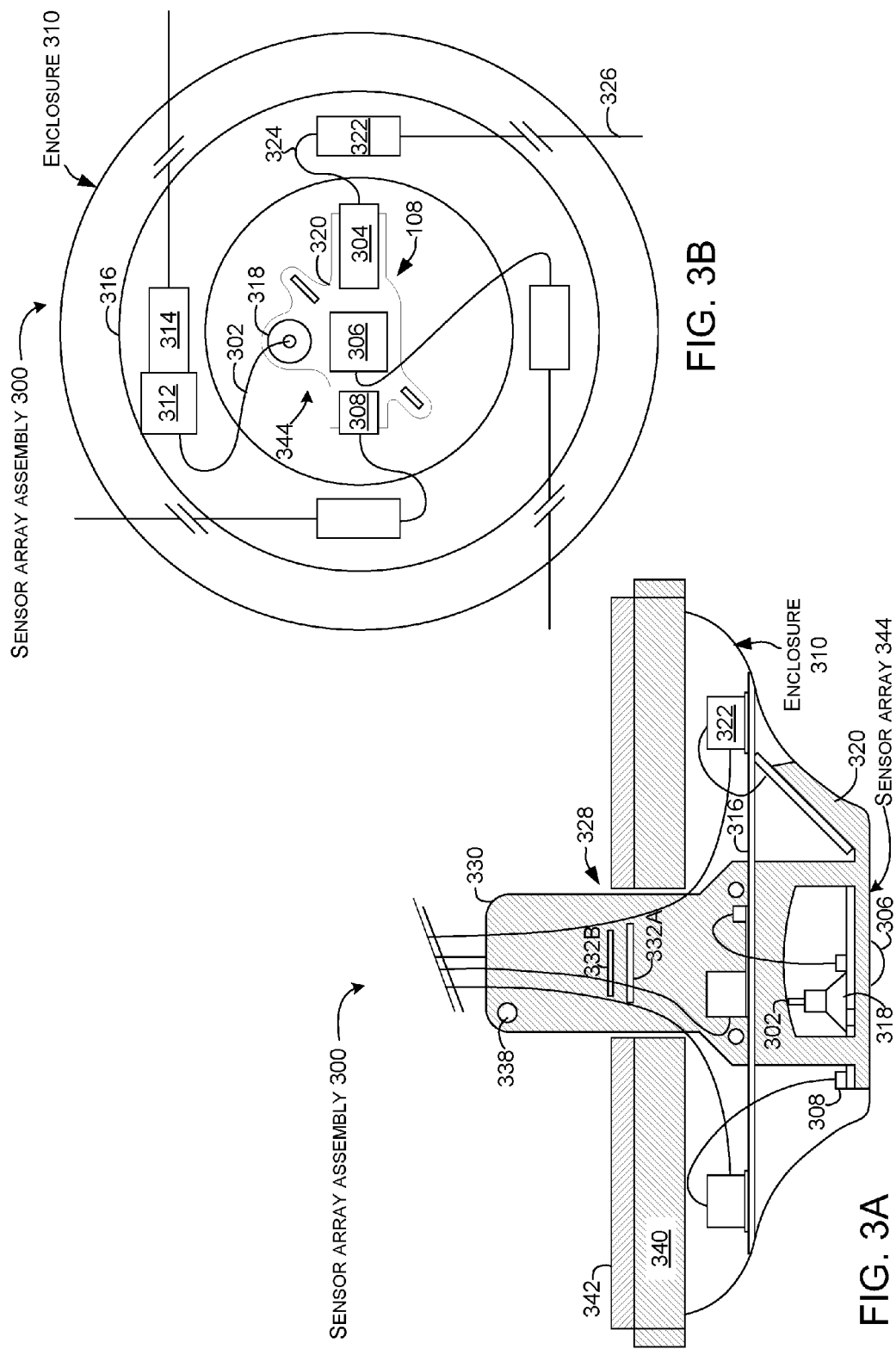

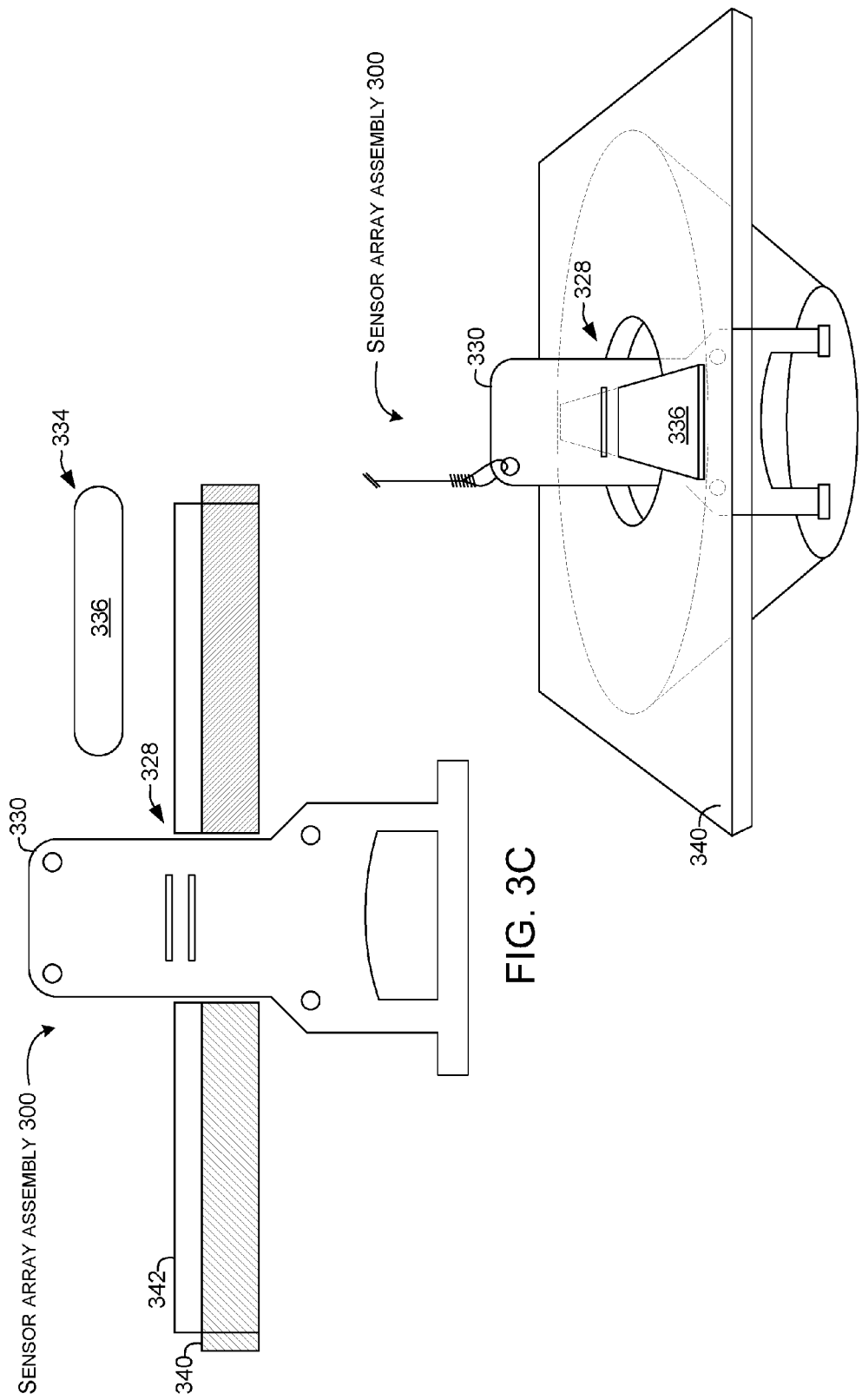

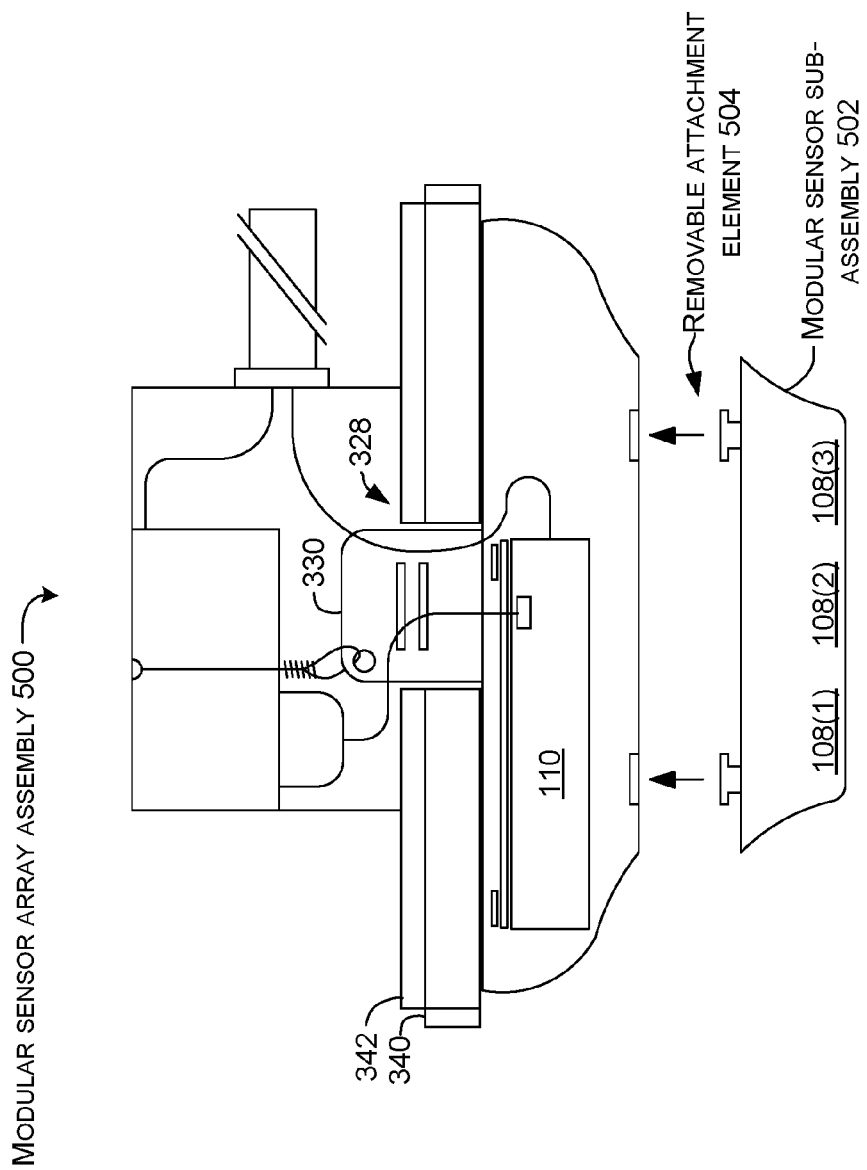

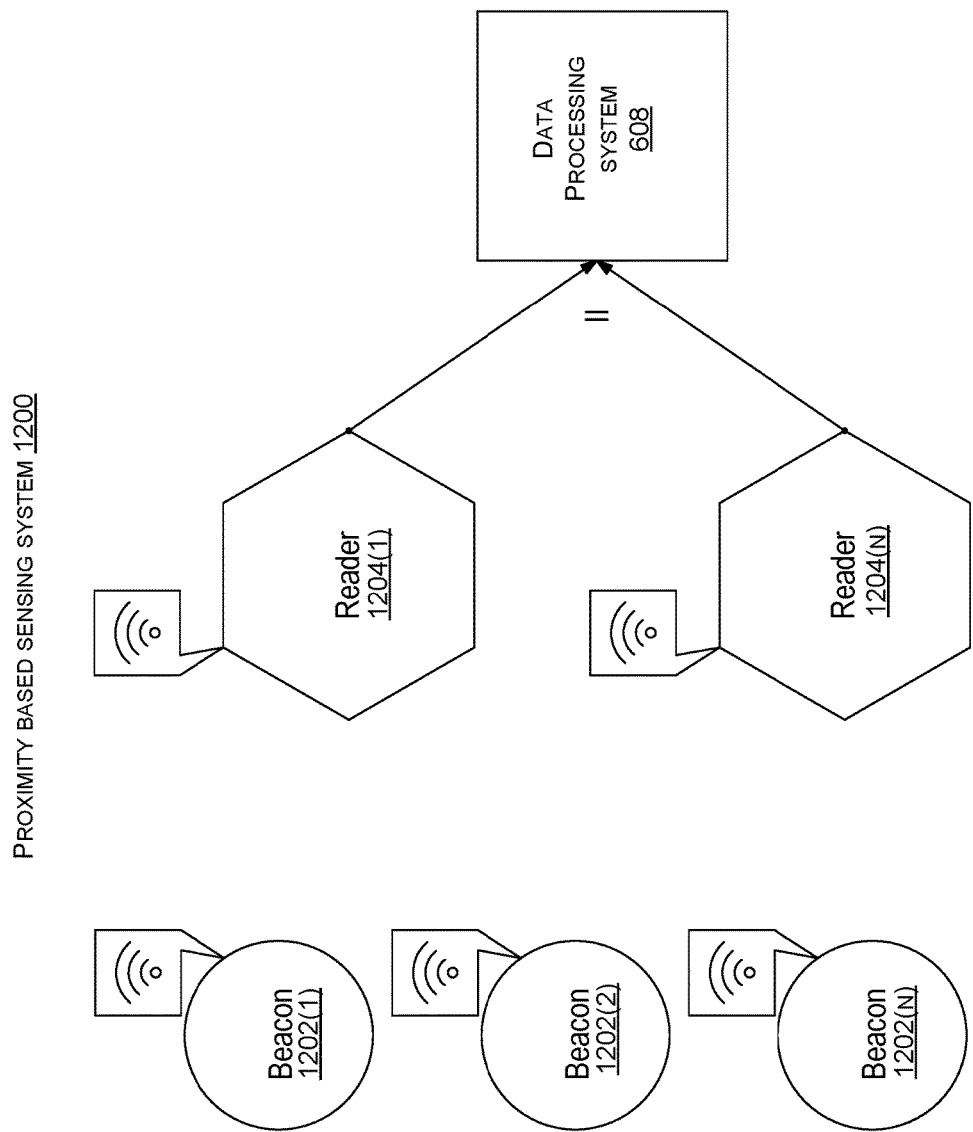

ARCHITECTURE FOR INTERNET OF THINGS

PRIORITY

The patent application is a non-provisional of, and claims priority to, U.S. Provisional Application 62/237,478 filed on Oct. 5, 2015, which is incorporated in its entirety.

BACKGROUND

This patent relates to internet of things (IoT) devices and utilizing IoT devices in various systems.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings.

FIG. 2 shows an example IoT assembly in accordance with some implementations of the present concepts.

FIGS. 3A-3C, 5A, 5C, and 5D are example sectional views of sensor array assemblies in accordance with some implementations of the present concepts.

FIGS. 3D and 4 are example perspective views of sensor array assemblies in accordance with some implementations of the present concepts.

FIGS. 6-10 and 12 are example diagrammatic representations of various IoT aspects in accordance with some implementations of the present concepts.

DETAILED DESCRIPTION

This patent relates to internet of things (IoT) devices and utilizing IoT devices in various systems to provide information and experiences to users. One of the concepts relates to a platform for enterprise IoT that can be used for a variety of environments and scenarios. Another concept relates to the IoT devices and assemblies that allow the IoT devices to be utilized in an efficient and collective manner that may not be achievable by a single device in isolation. Thus, some of the inventive concepts can relate to the designs and assemblies that enable the installation of IoT sensors in enterprise settings. Other concepts relate to a modular platform that can allow easy swapping of enterprise sensors, and additionally the use of wireless sensors which can also reduce the efforts of serviceability and costs for deployment. Another concept involves systems architecture and software that can enable enterprise IoT implementations. These concepts can be applied in various scenarios to help the productivity of end users and facilities administrators, such as relating to open floor plans and meeting spaces. Other inventive concepts relate to deploying, utilizing, and/or managing IoT devices in the enterprise—from physical infrastructure deployment to software services and experiences.

Other implementations relate to improving employee productivity and facilities knowledge through low cost IoT sensors—including in open floor plan and meeting room scenarios. For instance, these implementations can involve the use of sensors in office settings to enable/monitor open floor plan and meeting room usage patterns and productivity. Other implementations relate to industrial components that make deployment of sensors easy/feasible/economical in various settings, such as enterprise settings. Other concepts relate to systems design that provide enterprise IoT services built on the cloud (e.g., cloud services). Various aspects are described below.

Figure 1:
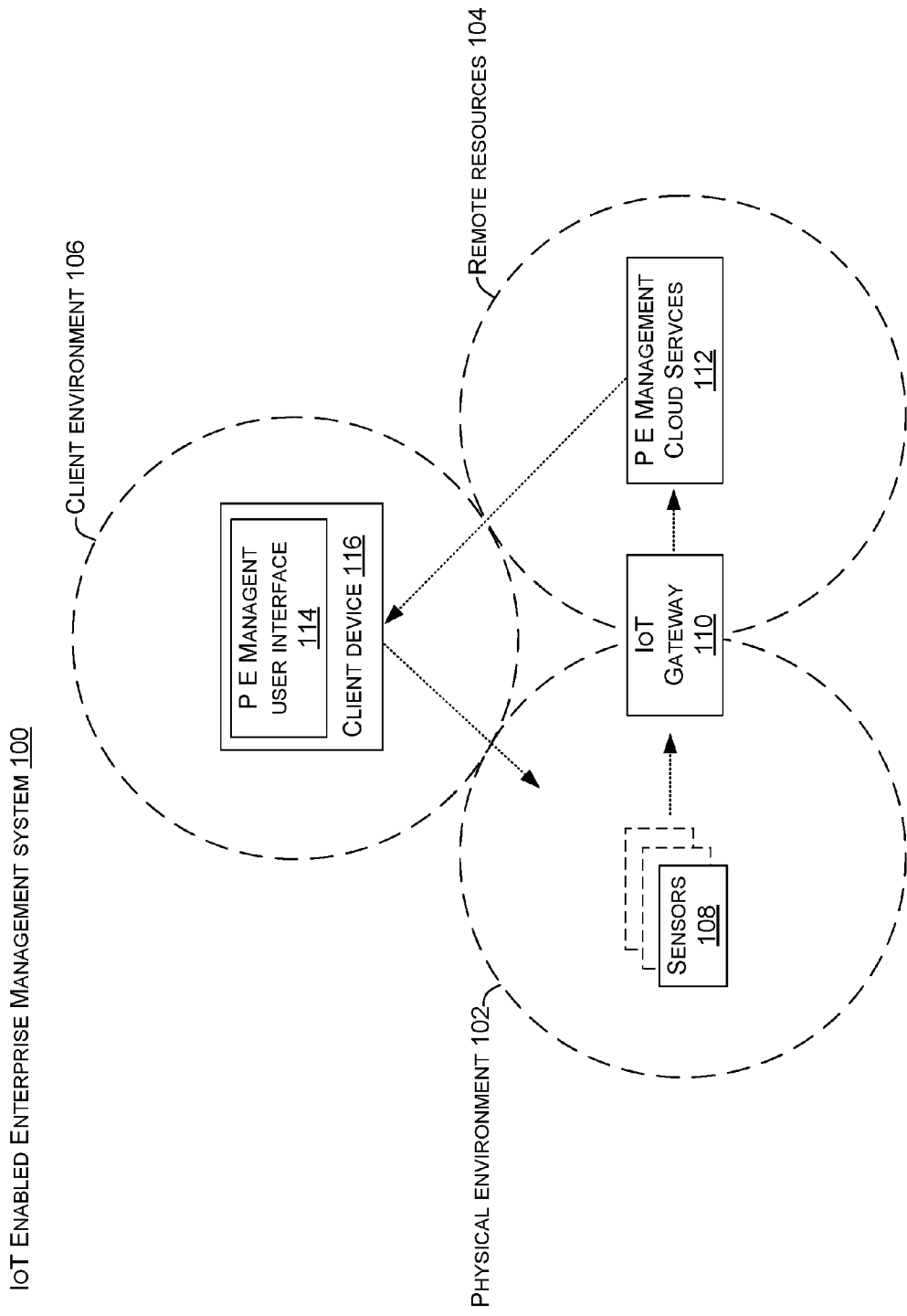
FIG. 1 shows an example IoT enabled enterprise system in accordance with some implementations of the present concepts.

FIG. 1 shows an IoT enabled enterprise management system 100. In this example the IoT enabled enterprise management system is organized into a physical environment (e.g., area of interest) 102, remote resources 104, and a client environment 106. Sensors 108 can be positioned in, and/or proximate to, the physical environment 102. The sensors can interact with an IoT gateway device (e.g., IoT device or IoT gateway) 110 which in turn can communicate with physical environment management cloud services 112 provided by cloud-based remote devices or resources. The physical environment management cloud services can surface information that can be presented to an end user and/or a facilities administrator as a "smart building" or "physical environment management" user interface 114, such as on a client device 116. The user may be interested in using and/or managing the physical environment 102.

From one perspective, some of the present concepts can relate to systems and designs for utilizing sensors 108 in physical environment 102. This can include a) physical component designs that house sensors and IoT gateways (e.g., described for example at least relative to FIGS. 2-5); b) software infrastructure that include systems architecture, logic, and/or algorithms that store and process sensor data (e.g., described for example at least relative to FIGS. 6-10); c) client applications and other forms of presentation in the environment that present processed information and allow for interaction (e.g., described for example at least relative to FIG. 11A-11C); and/or d) proximity sensor solutions for experience automation (e.g., described for example at least relative to FIG. 12).

FIG. 2 shows a physical component design example (e.g., IoT assembly 200). The IoT assembly can include an enclosure 202, mounting plate 204, network conductor/cable 206, IoT gateway 110, such as computer 208, conductors, such as 4p cable/conductor 210, adapter 212, adapters 214, conductors, such as RJ45 cable 216, power supply 218, electric plug panel 220, and/or power conduit 222. In one case, the IoT gateway 110 is manifest as a Raspberry Pi 2. Other IoT gateway examples can include Arduino, Minnow Board, Intel Edison or NUC, different generation Raspberry Pi devices, and/or other embedded computing devices, among others. Note that any of conductors 206, 210, and/or 216 (e.g., physical conductors, such as wires) can be eliminated by employing wireless communication technologies instead, and an integrated "all-in-one" wireless sensor and IoT gateway array with integrated computing is another example. The IoT gateway 110 can communicate with sensor arrays (described below relative to FIGS. 2-3) and/or other resources, such as cloud-based resources.

FIGS. 3-5D collectively show an example sensor array assembly 300 that can accept multiple types of sensors 108 and can be communicatively coupled to IoT assembly 200 of FIG. 2. In this example, the sensors can include a microphone 302, temperature and/or humidity sensor 304, motion sensor 306, and/or a light sensor 308. In the case of FIG. 3, sensor array assembly 300 can include a sensor array enclosure 310, sound card 312, such as a USB sound card, an adapter 314, such as USB to RJ45 adapter, an adapter ring 316, a microphone mount 318, a sensor array foot plate (e.g., sensor plate or sensor board) 320, an adapter, such as a 4p to RJ4S adapter 322, conductors, such as a 4p cable 324, an RJ45 cable 326, and a mounting element 328. In some cases, the mounting element can be manifest as a slipstick mount 330, a slipstick aperture 332 (332A for ¾" and 332B for 1"), a connector 334, such as a slipstick stick (e.g., slipstick) 336, and/or an earthquake wire aperture 338. In this case, the mounting element 328 is readily and quickly employed with either a ¾" plenum ceiling tile 340, and/or a 1" plenum ceiling tile 342. In some cases, the mounting element can be manifest as a heat-vented magnetically-mounted base plate system, or the heat-vented magnetically-mounted base plate system can be used in conjunction with the slipstick system. An example heat-vented magnetically mounted base plate system is described below relative to FIGS. 5B-5C.

The sensor array foot plate 320 can allow specific sensors, such as temperature sensor 304, to be mounted within the sensor array enclosure 310. The sensor array foot plate 320 and/or the microphone mount 318 can allow for specific sensors, such as a loudness sensor or microphone 302, to be attached and increase the performance of the sensor through acoustics principles (e.g., by use of a cone).

Sensor array assembly 300 can allow consolidation and attachment of numerous sensors of various types, and other components, into a single sensor array 344 that can be installed in a physical environment or area of interest. For instance, the sensor array can be attached in, or proximate to, an area of interest. For example, the sensor array assembly 300 can be secured above a ceiling tile in the area of interest, such as a room, foyer, hallway, entryway, garage, etc.

Slipstick 336 in combination with slipstick mount 330 can allow for quick mounting of sensor array assembly 300 to a surface, such as a plenum ceiling tile 340 or 342 by way of compression. A magnetically-mounted baseplate system can optionally be used, and the use of a cylinder or another shape heat-vent mount could also be used as an alternate mounting system. An example magnetically-mounted baseplate system is described below relative to FIGS. 5B-5C.

Note that in this implementation, the sensors 108 can report to computer 208 (FIG. 2) which in turn can function as the IoT gateway 110 (FIG. 1). In other implementations, some or all of the sensors 108 can alternatively or additionally function as IoT gateways 110 and/or be part of a highly integrated sensor and gateway design.

Figure 4:
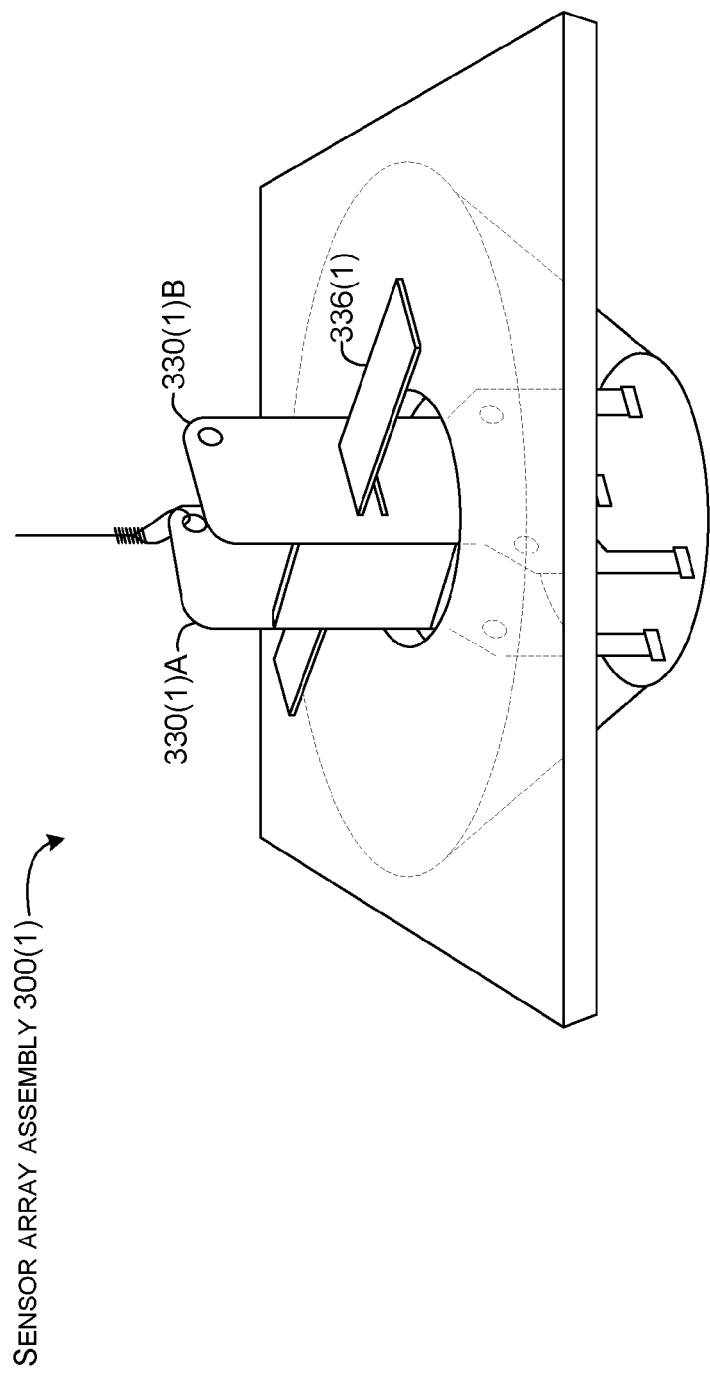

FIG. 4 shows an alternative sensor array assembly 300(1) that includes a single slipstick 336(1) that engages one of two slipstick mounts 330(1)A and 330(1)B. FIG. 5A shows another sensor array assembly that can combine elements of FIG. 2 with elements of FIGS. 3A-4 into a single assembly (e.g., modular sensor array assembly 500). For instance, modular sensor array assembly 500 can include combined computing elements and sensor elements. For example, modular sensor array assembly 500 can include an IoT gateway 110 and multiple sensors 108. In this case modular sensor array assembly 500 can be viewed as a modular sensor sub-assembly 502 that has one or more sensors 108 mounted on it. The modular sensor sub-assembly can be removed and/or swapped out without uninstalling the modular sensor array assembly. The modular sensor sub-assembly can be removed physically and electrically coupled or linked to the IoT gateway 110 via a removable attachment element 504. For instance, magnets can be used to electrically couple sensors 108 of the modular sensor sub-assembly 502 to the IoT gateway and to physically secure the modular sensor sub-assembly 502 to the remainder of the modular sensor array assembly 500 (e.g., magnetically-mounted). (The term magnetically-mounted can be applied within the modular sensor array assembly (e.g., to couple portions of the assembly) and/or to the overall modular sensor array assembly (e.g., the assembly to the substrate). As another implementation, removable attachment element 504 can employ Velcro for the physical attachment with conductive sensor pads electrically coupling the sensors to the IoT gateway. Still others can employ clasps or other fasteners.

In one case, the sensors 108 can be organized in the modular sensor sub-assembly 502 (such as in a hash pattern) so that individual sensors are coupled to corresponding inputs of the IoT gateway 110. Individual sensors can be readily added and/or replaced on the modular sensor sub-assembly 502.

Figure 5B:
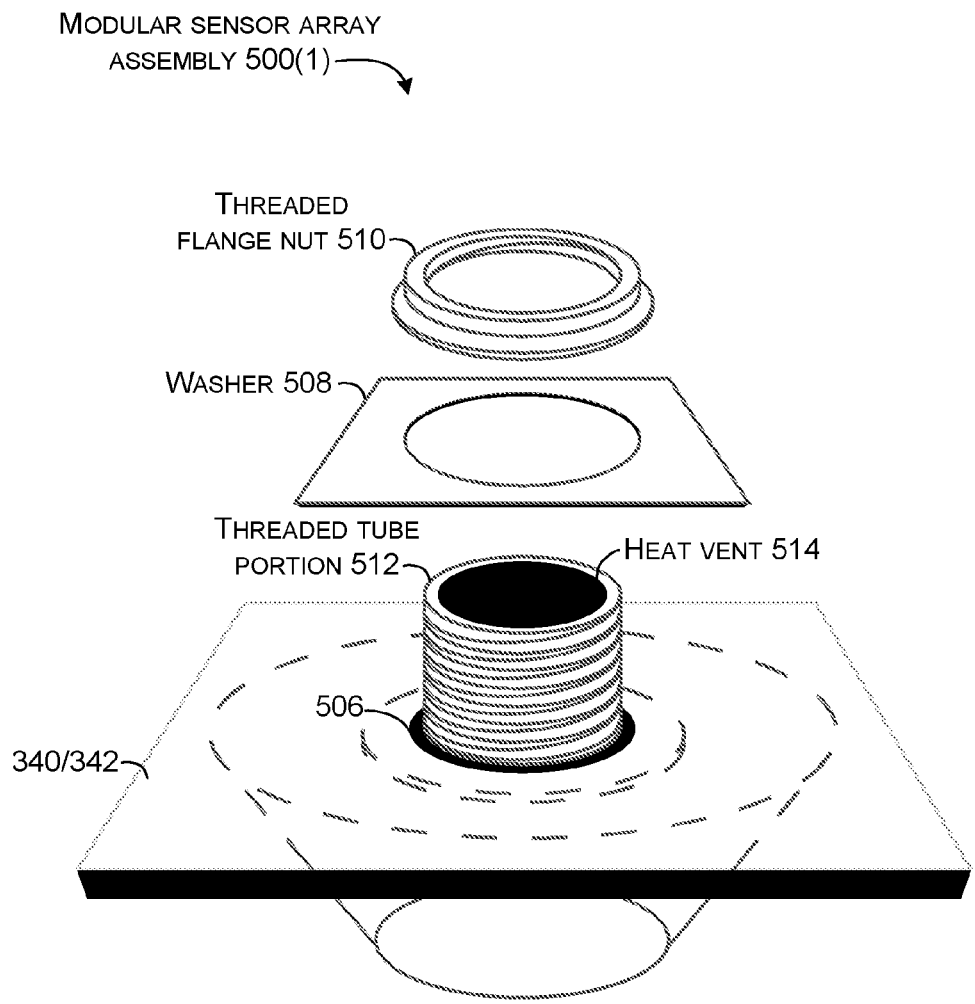
FIG. 5B is an example exploded perspective view of sensor array assemblies in accordance with some implementations of the present concepts.
Figure 5C:
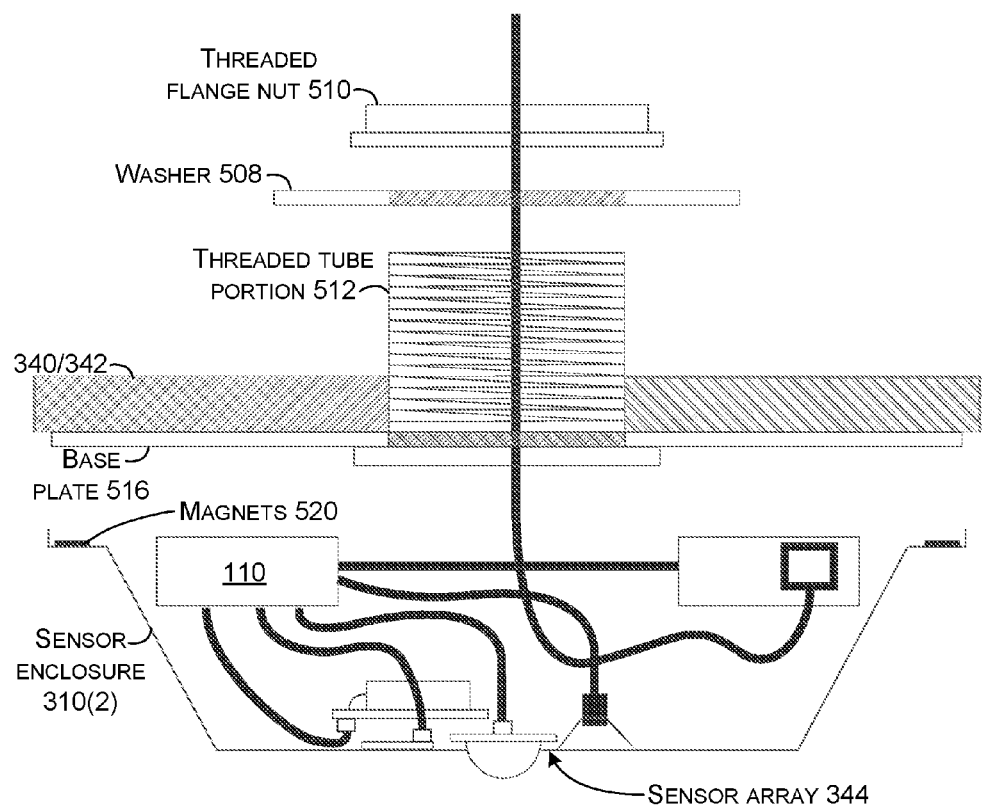

FIGS. 5B-5C show still another modular sensor array assembly 500(1) that can be mounted through a hole or aperture 506 in a substrate, such as a plenum ceiling tile 340/342. A washer 508 and a threaded flange nut 510 can be positioned on a threaded tube portion 512 that extends through the aperture 506. Adjustment of the threaded flange nut 510 on the threaded tube portion 512 can facilitate use with different substrate thicknesses. Further, the threaded tube portion 512 can be hollow to create a heat vent 514 that facilitates heat dissipation from the modular sensor array assembly 500(1).

The modular sensor array assembly 500(1) can also include a base plate 516 and sensor enclosure 310(2). The base plate 516 can be retained by the threaded tube portion 512 against the ceiling tile 340/342. The sensor enclosure 310(2) can be magnetically-mounted to the base plate. For instance, the base plate 516 can be a magnetic metal and/or include metal portions and the sensor enclosure 310(2) can include magnets 520. The sensor enclosure 310(2) can hold sensor array 344 and IoT device 110. The sensor enclosure can be readily detached to add and/or replace sensors of the sensor array 344 and/or for replacement with another sensor enclosure.

Figure 5D:
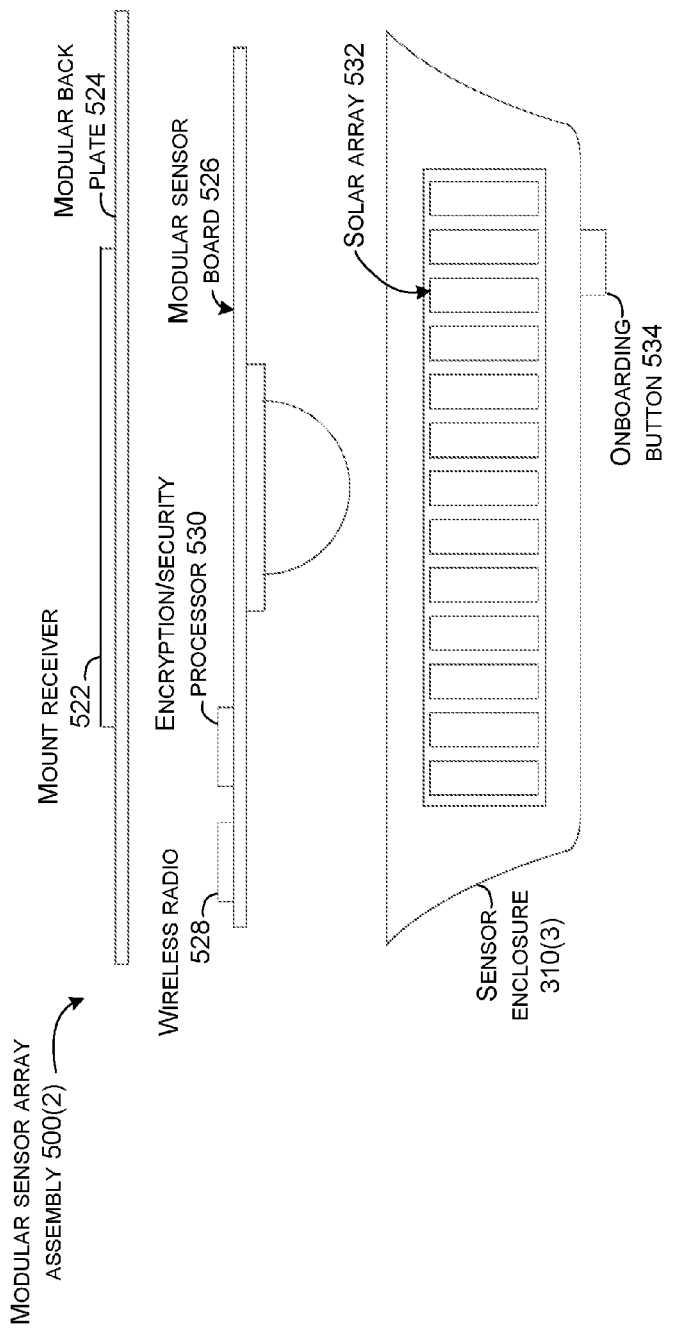

FIG. 5D shows another modular sensor array assembly 500(2). In this implementation, as will be explained below, modular sensor array assembly 500(2) can be termed an energy harvesting modular sensor array assembly 500(2). The energy harvesting aspect can allow the energy harvesting modular sensor array assembly 500(2) to be simpler to install because it doesn't need to be physically connected to a power supply. Further, energy harvesting modular sensor array assembly 500(2) can operate without a battery, and/or with a rechargeable battery that is recharged by the energy harvesting, and thus requires less servicing than an implementation that relies solely on battery power.

The illustrated energy harvesting modular sensor array assembly 500(2) can include a mount receiver 522 with a modular back plate 524. The energy harvesting modular sensor array assembly 500(2) can also include a modular sensor board 526 or alternatively a fixed sensor array. Various sensors can be positioned on the sensor board 526. Various sensor examples are discussed above and are not revisited here. The energy harvesting modular sensor array assembly 500(2) can also include a wireless radio 528, encryption/security processor 530, a solar array 532, a sensor enclosure 310(3), and an onboarding button (e.g. power switch) 534. The solar array can allow the energy harvesting modular sensor array assembly 500(2) to be powered by ambient light in the area of interest. This configuration can allow an area of interest, such as a building and/or campus to be set-up very quickly and inexpensively. For instance, installation labor costs may be 1/10 as much for a wireless system than a wired system where power and communication conductors are run throughout a building to the various sensor array assemblies.

Thus, some sensor array assembly 300/500 implementations can be viewed as a single touch sensor design. Some such implementations can be wireless sensor designs that can "onboard with a single touch." In one such case, the sensor array assembly 300 or 500 can be a completely wireless sensor package (e.g., powered by light) that can be easily deployed in a "stick to the wall or ceiling" manner. The sensor array assembly 300 or 500 can communicate with (or include) IoT gateway 110 that is connected to the cloud (many wireless sensors can connect to a single IoT gateway).

The sensor array assembly 300/500 can have an arbitrary number of sensor types including but not limited to: sound, motion, temperature, humidity, light, Bluetooth Low Energy, air quality, and more. The sensor array assembly can both have fixed sensor or even modular sensor modules that can be added, removed, or replaced in the future. The sensor array assembly can have built in integration into a services ecosystem, such as with the IoT gateway 110.

In some cases, upon activation the sensor array assembly 300 or 500 can register itself with the IoT gateway 110 and/or cloud services such as the IoT hub or physical environment management cloud services 112 (FIG. 1) and can be onboarded (e.g., activated on the system) in an automated fashion. From the moment it is activated, sensor data can automatically flow to physical environment management cloud services 112 and ultimately to the associated subscription (e.g., physical environment management user interface (114, FIG. 1) registered to receive information relating to the physical environment associated with the sensor array assembly 300 or 500.

For instance, the sensor array assembly 300/500 can use wireless triangulation technology (e.g., triangulate its physical location relative to other known Wi-Fi access points, Bluetooth or other beacons) to self-identify and pre-populate its location in the physical environment (for those not equipped with that technology it can be manually added). Such an implementation is described below relative to FIG. 12. The sensor array assembly 300/500, by way of the IoT gateway 110, can also provide health/heartbeat/management data into the physical environment management cloud services 112 upon activation, with the ability to be centrally managed through cloud services. The sensor array assembly 300/500 can also be natively secured including but not limited to the use of cryptography to encrypt data in-transit or at rest on the array and/or IoT gateway, as well as other forms of enterprise grade security (e.g., security mechanisms).

These wireless sensor array assemblies 300/500 can provide several potential advantages. For instance, the wireless sensor array assemblies can be quick and/or inexpensive to install due to no writing or complex installation procedures needed. Another potential advantage is that the wireless sensor array assemblies can be flexible both in terms of "all in one" sensor design whether fixed or modular.

Still another potential advantage can be instant integration into a product ecosystem (e.g., the physical environment management cloud services 112) with reduced or no set up. Further, the wireless sensor array assemblies can offer self-identifying location within buildings or other physical environments. Alternatively, codes, such as QR codes (or Wi-Fi or BLE signals) can be pre-registered in a system and coupled with an application to easily scan a unit. The application can tell the physical environment management cloud services where in the building it is, using a series of easy menus or a floorplan map—to make deployment and system registration really easy. This process can be used on both wireless and wired sensor array assemblies.

From one perspective some implementations can provide a wireless sensors unit (e.g., powered by ambient light) that can be onboarded in one touch and has a variety of flexible modules including wireless modules and various sensor types. Other implementations can provide a heat-vented magnetically mounted base plate system.

FIGS. 6-10 collectively show example data communication relationships associated with processing and utilizing data from and/or relating to sensors 108 (e.g., sensor data 600). This data communication can be accomplished via a sensor processing system (SPS) 602. The SPS can be viewed as a set of software, cloud services, firmware, and/or hardware components that work together to collect and process data from sensors 108 (e.g., from the sensor array assemblies 300 and/or 500 described above (and/or other assemblies), both in real time and/or subsequently. In some implementations SPS 602 can be made up of five aspects that can work together; a device framework 604 (discussed relative to FIG. 7), a management system 606 (discussed relative to FIG. 7), a data processing system 608 (discussed relative to FIG. 8), a data abstraction system 610 (discussed relative to FIG. 9), and/or system applications 612 (discussed relative to FIG. 10). Management system 606, data processing system 608, data abstraction system 610, and/or system applications 612 can be viewed as elements of the physical environment management cloud services (112 of FIG. 1). Sensor data 600 can start flowing into the sensor processing system 602 from the device framework 604. This aspect is described in more detail relative to FIG. 7.

Figure 7:
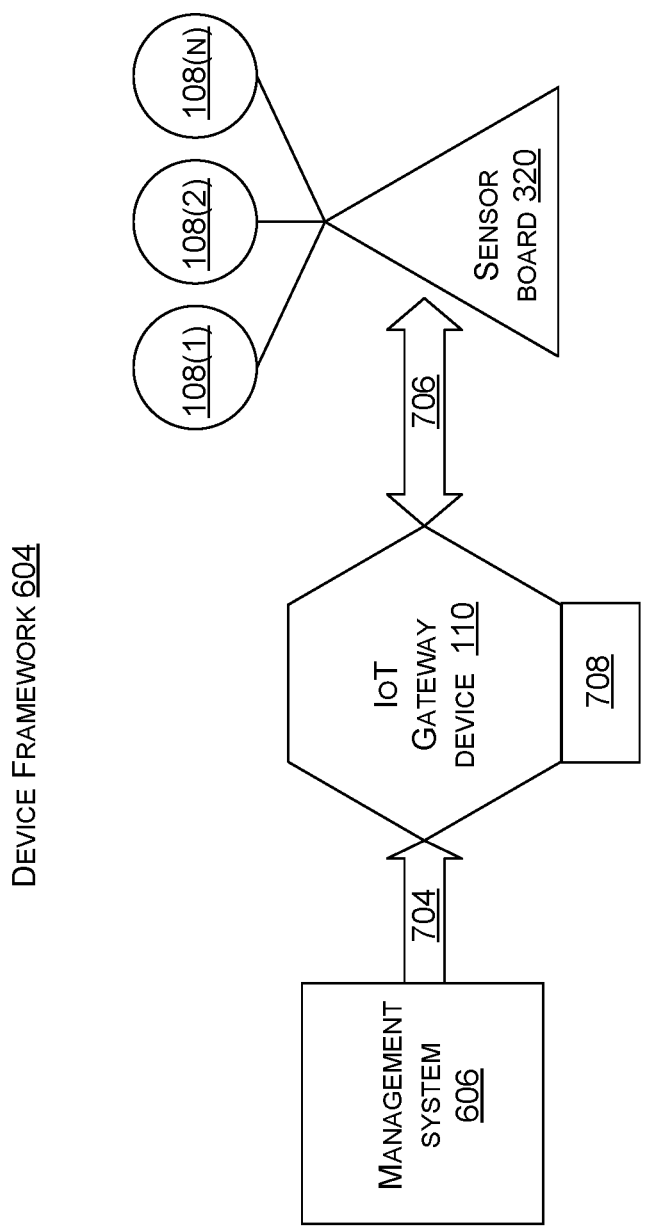

FIG. 7 shows an example of device framework 604. In this example the device framework can include IoT configuration/management system (e.g., 'management system' 606, IoT gateway device 110, sensor plate or sensor board 320, and/or sensors 108.

At 704, connection of the management system 606 to the IoT gateway device 110 can allow the management system to configure the IoT gateway device. At 706, connection between the IoT gateway device 110 and the sensor board 320, such as via an inter-integrated circuit (I2C), can allow data communication from the sensors 108 to the IoT gateway 110. These sensors 108 can collect and report data to the IoT gateway 110, which can then package the data up and send it the management system 606.

In some implementations, IoT gateway 110 can include or be supported by a software/firmware platform 708. The software/firmware platform can be viewed as a core operating system and/or applications that interface with management system 606 and/or the physical environment cloud services (112, FIG. 1).

The software/firmware platform 708 can allow interactions with the sensors 108. For instance, the software/firmware platform can interface with management system 606 to load the configuration of the sensors. The software/firmware platform can interface with sensors at a low level and provides abstractions to read data. The software/firmware platform can provide immediate processing according to sensor requirements. The software/firmware platform can support mechanisms to push data to management system 606, which can provide processing and/or storage, among other functions alone and/or in combination with other elements of FIG. 6.

The software/firmware platform 708 can also provide various logging and telemetry functions. For instance, the application can look into the existing device logging system (if one exists) and can support creating the user's own logging system. As logs are created they can be processed by the application which submits this data to cloud processing.

The software/firmware platform 708 can also provide health monitoring. The software/firmware platform can monitor various metrics for device health. The software/firmware platform can support mechanisms to push data to cloud processing.

Figure 9:
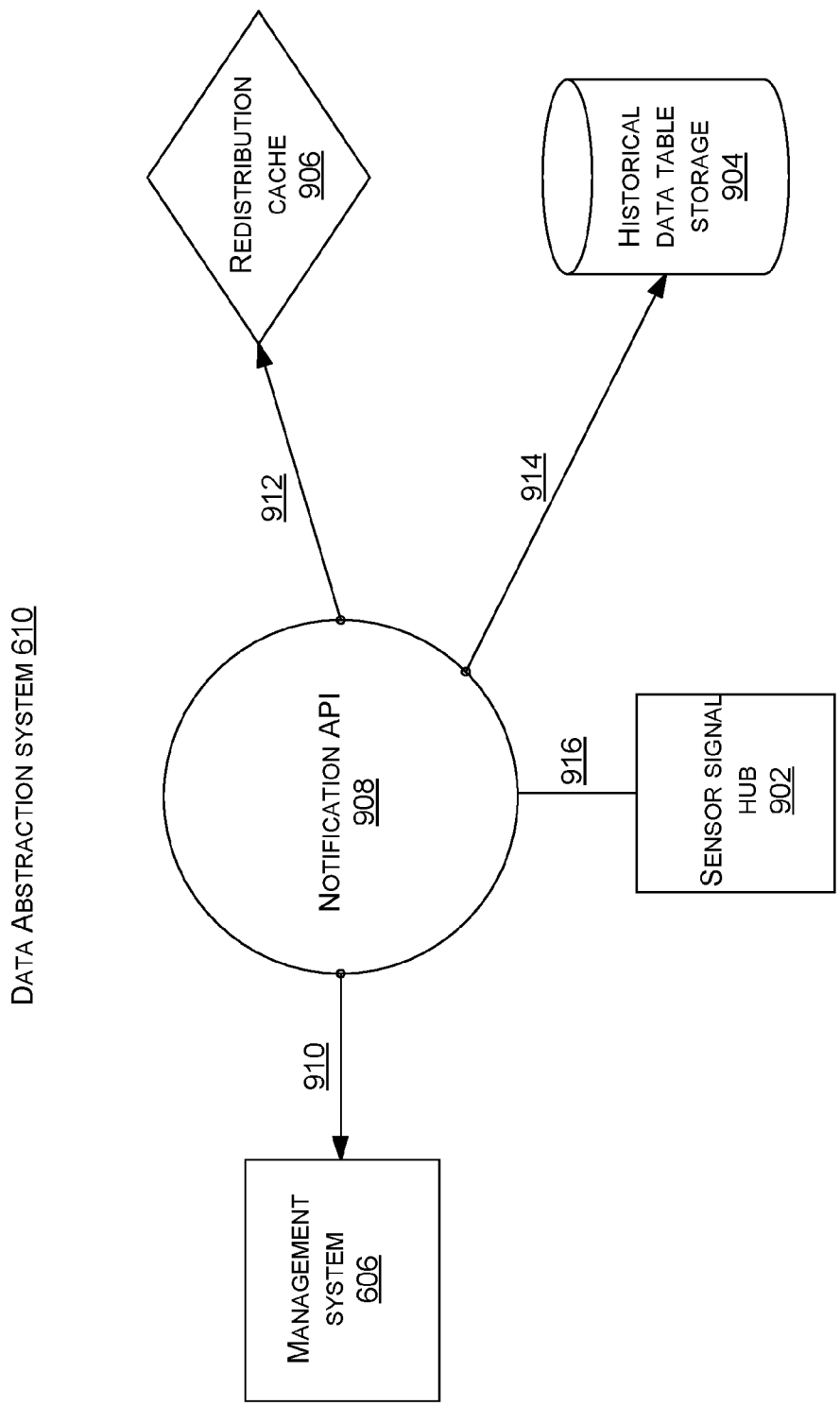

The software/firmware platform 708 can also contribute to a notification system (e.g., see notification API 908, FIG. 9). Briefly, the notification system can be viewed as an endpoint for data. The notification system can make available to clients a means to retrieve data (recent and historical). The notification system can provide various feeds on the data so clients can receive data that is relevant. The notification system can provide a configurable way to expose more complex data streams that are derived from the core sensor/device data.

In some implementations, management system 606 can be manifest as a cloud-based system which supports the configuration of IoT gateways 110. The management system can provide interfaces to manage IoT gateways, sensors 108, and/or overall system configuration. The data can be used to model the real world setup of the devices and sensors providing logical abstractions to data. The management system can provide interfaces to communicate with the IoT gateways to provide health monitoring and real time updates to the gateways configuration. The management system can expose an API to allow other systems to interact and manage the configuration. This can also include other remote management capabilities such as pushing device updates to IoT gateways, performing reboots, remote configuration changes, and more.

Figure 8:
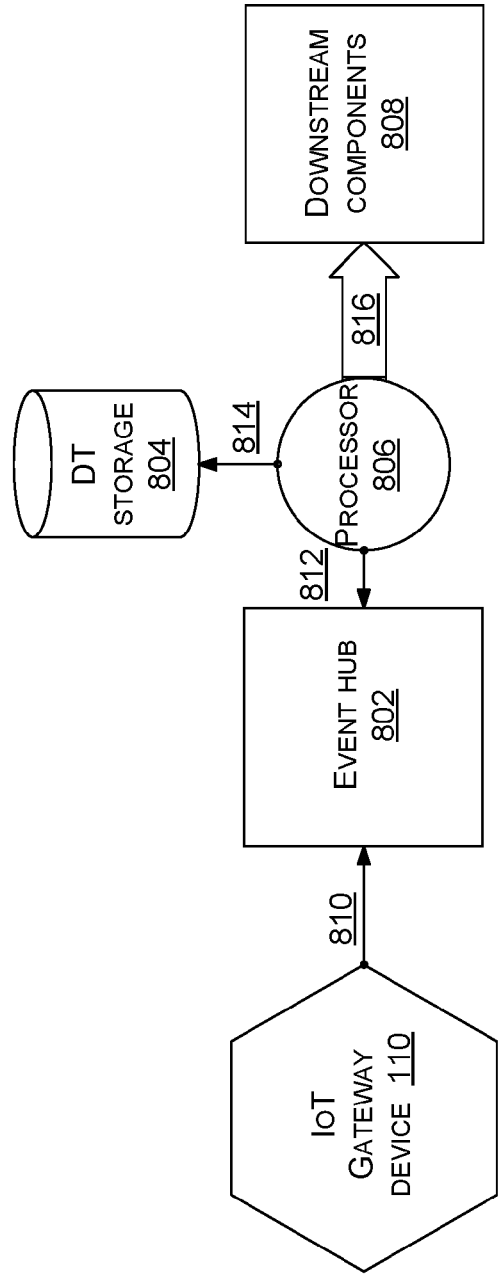

FIG. 8 shows example data processing system 608. The data processing system 608 can ingest sensor data in real time. In this case data processing system 608 can involve IoT gateway 110, an IoT event hub 802 (alternatively an event hub or other ingestion/ingress service can be used), data table storage 804, a processor 806, and downstream components 808. The data processing system can entail both processing and logging the sensor data 600. The sensor data can be processed to determine if it is actionable and logged at the same time for analysis at a later point (to support things like machine learning and predictive analytics). For instance, at 810 a connection, such as via an advanced message queuing protocol (AMPQ), between IoT gateway 110 and the IoT event hub 802 can allow data communication from the IoT gateway 110 to the IoT event hub. Standards communication protocol and schemas such as those prescribed by emerging standard bodies such as IPSO, IIC, AllSeen Alliance, OIC can also be utilized. At 812, the processor 806 can subscribe to the IoT event hub 802 and receive data for various forms of processing. At 814, the data table storage 804 can be used for historical data tracking (e.g., state management). At 816, the processor 806 can forward the processed data downstream depending on the type of data. This may be an event, hub analytics, data abstraction, etc.

In some configurations data processing system 608 can be viewed as a highly scalable data ingress/egress system to support near real time processing of sensor data 600. Data processing system 608 can function as the bridge between devices and the various downstream services which interact with sensor data. The data processing system can provide a configurable way to chain data processing for complex analysis of device data. Data processing system 608 can take advantage of cloud services (FIG. 1), but can also perform processing locally on the IoT gateway device 110 and/or other resources.

FIG. 9 shows example data abstraction system 610. The data abstraction system can include management system 606, a sensor hub 902 (such as SignalR or other push/hub mechanism), historical data table storage 904, and/or a cache, such as Redis cache 906. These facets can be utilized for generating a notification application program interface (API) 908. Stated another way, these components can contribute to a notification system that can notify users via the notification API. The notification API can contribute to generating the physical environment management user interface 114 of FIG. 1.

Once the sensor data has been processed and logged into the data processing system 608 (e.g., FIG. 8), the sensor data 600 can be passed to the data abstraction system 610 where the sensor data can be combined with other data or left alone and pushed to any client applications. For instance, at 910 the management system can be used to load the logical/physical relations of sensors 108 and other data configurations. This can be used to compute data abstractions. At 912 the notification API 908 can receive processed data. The Redis cache 906 can be used to maintain recent state. Here the processed data can be combined with management data to generate abstractions for clients. At 914, historical data table storage 904 can be used to track/access historical data. At 916, the sensor SignalR hub 902 can be used to segment sensor data by sensor type and/or data type so clients can subscribe to just the data they wish to acquire.

Figure 10:
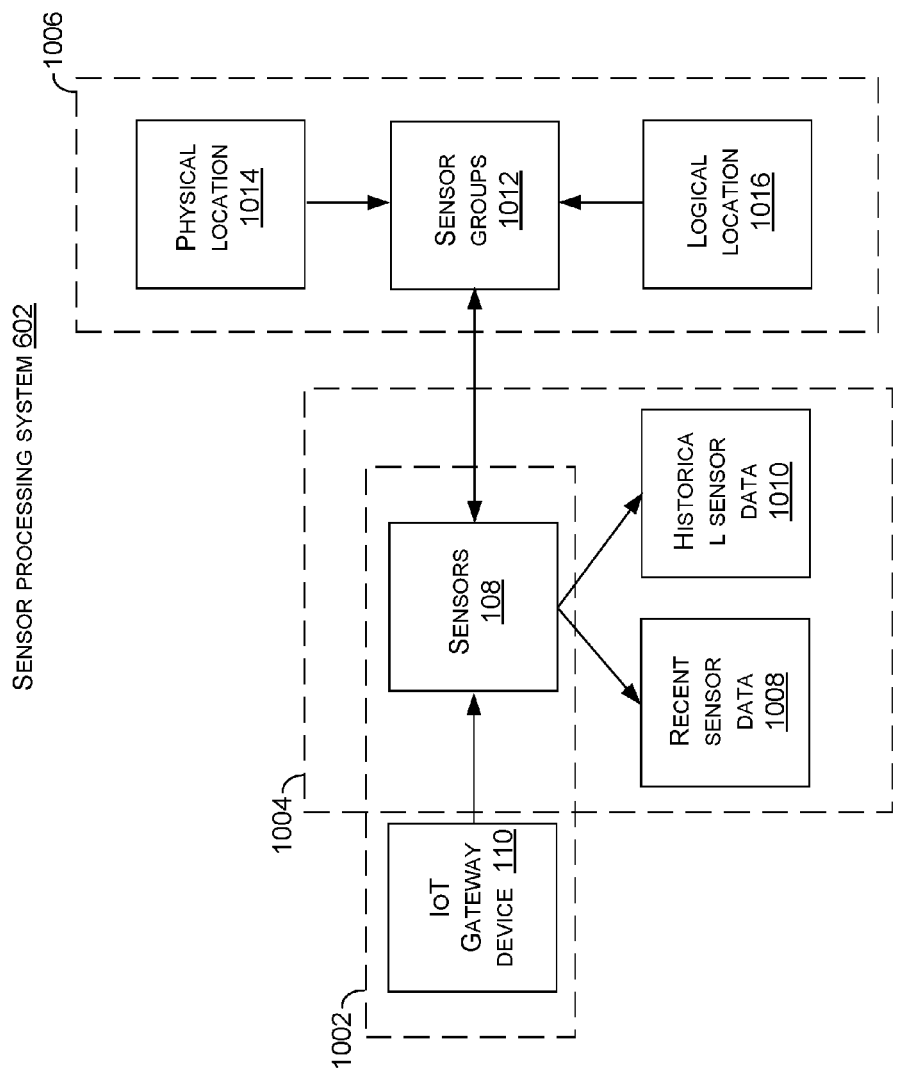

FIG. 10 shows information about device configuration abstractions 1002, data storage abstractions 1004, and client abstractions 1006. In this example, device configuration abstractions 1002 can relate to IoT gateway devices 110 and/or sensors 108. Device data and/or relationships can be mapped by the device configuration abstraction 1002. Data can be mapped to the sensors themselves in the data storage abstraction 1004. The sensors 108 can be grouped by location to provide client abstraction 1006 for mapping sensor data 600 to physical and/or logical locations.

A client application can listen for data from the data abstraction 1006 so that the client application can 'action' that data and present it to an end user. The end user can then use that actioned data in any way deemed useful.

The management system 606 can support the infrastructure of the various components to achieve the described functions. For instance, the management system 606 can live in the cloud and can provide a way to manage the devices, data, and/or clients. The management system 606 can provide abstractions that flow through each component.

The device framework 604 can be implemented as software or firmware running on an embedded computing device (e.g., IoT gateway 110) to collect and process sensor data 600. The management system 606 can give the IoT gateway 110 a configuration. This configuration can inform the IoT gateway 110 what it is and its attached components (e.g., device is configured to know it has a motion sensor of a certain style attached to a specific port, another style of motion sensor and a temperature attached to other specific ports, etc.) and how/what data it will attempt to collect and process (e.g., collect motion data every 30 seconds from both ports, collect temperate data every 5 minutes and send back to the physical environment management cloud services, etc.).

For example, code running on IoT gateway 110 can receive a list of sensors 108 and the ports those sensors are attached to on the IoT gateway from the management system 606. The IoT gateway 110 can then read data from those sensors 108 via the sensor board 320 at a rate again provided in its configuration and can pass that data to data processing system 608.

A specific example of this is the IoT gateway 110 can ask for its configuration on boot via a representational state transfer (REST) call to the management system 606. The management system can supply some configuration that says the IoT gateway 110 has a motion sensor 306 (FIG. 3) attached to it on port D1 and it should read data from that sensor every 30 seconds, for example. The IoT gateway 110 can then start its reading process and every 30 seconds sends up data from the motion sensor to the data processing system 608. Below is an example algorithm of how this can look in code. IoT gateway 110 can go through each sensor 108 it receives and can create a service to read those sensors. The IoT gateway 110 can then start reading and uploading data. In this example, the IoT gateway 110 is a raspberry Pi II, the sensor board 320 is a grove pi. Alternative configurations are contemplated.

```
private static void RunPiSense( )
{
    if (!testMode) { CheckHostname( ); }
    ProcessHelper.GroveResetCheck( );
    List<SensorModel> processedSensors = new List<SensorModel>( );
    string testReadLog = "Test Read: {0}";
    foreach(var sensor in deviceInfo.Sensors)
    {
        if(!processedSensors.Contains(sensor))
        {
            switch(sensor.Type)
            {
                case SensorType.Light:
                    CreateLightService(testMode,
                        testReadLog, sensor);
                    break;
                case SensorType.Motion:
                    CreateMotionService(testMode,
                        testReadLog, sensor, motionPollRateTest);
                    break;
                case SensorType.Sound:
                    CreateSoundService(testMode,
                        testReadLog, sensor);
                    break;
                case SensorType.Humidity:
                case SensorType.Temperature:
                case SensorType.TemperaturePro:
                case SensorType.HumidityPro:
                    CreateTempHumService(testMode,
                        processedSensors, testReadLog, sensor);
                    break;
            }
            processedSensors.Add(sensor);
        }
    }
    //start data reader service
    Thread manager = new Thread(( ) =>
        SensorServiceManager.StartService( ));
    manager.Start( );
    SimpleLog.WriteEntry("PiSense services loaded, press any key to exit...");
    Console.ReadLine( ); //Sensor services run forever so we just wait
}
```

Returning to FIG. 6, data processing system 608 can provide an ingress point for data coming from the device framework 604. This ingress point can process and log data in real time. The data can be processed so that it can be actioned by the data abstraction system 610. The data can at the same time be logged into long-term storage so that additional analysis can be completed, including running the data through machine learning algorithms and supporting predictive analysis.

For example, IoT gateway 110, such as a Raspberry Pi 2, can be submitting data for the sensors 108 it has attached to a cloud computing service, such as Azure from Microsoft. The IoT event hub (802, FIG. 8) can then process this data in real time and log it to data table storage 804 for long term storage. The IoT event hub may also pipe the data to the correct endpoint in the data abstraction system 610.

A specific example of this data handling and processing is a IoT gateway 110 obtaining Bluetooth low energy (BTLE) readings from one or more beacons relating to a client device, such as a user's smart phone. The IoT gateway 110 can send the obtained readings to the IoT event hub 802. The IoT event hub can process specifics of the signal strength and client ID to determine how close the client device is to the IoT gateway 110. If the client device is found to be within a specified distance of the IoT gateway 110, that information can be sent to the data abstraction system 610.

Data abstraction system 610 can take the processed data and either combine the processed data with data from other systems or leave it in its raw state so that it can then be sent to any client applications that are listening.

For example, a notification hub can be listening for events from data processing system 608 so that the notification hub can then combine the raw event data with other data it has received from systems like conference room availability from a scheduling application. This data can then be pushed onto a notification API (908, FIG. 9) which is subscribed to by a client application. The data could also be used to inform others that a specific individual has entered a given area or conference room by using the processed Bluetooth Low Energy readings.

A specific example of this is IoT event hub (802, FIG. 8) which has processed some motion data and sent it to the notification API (908, FIG. 9). That real time motion data can then be combined with other motion data from the last two minutes from the same sensor so that it can provide a balanced picture of what the motion is for the space that the motion sensor is in. In an instance where the IoT event hub determines from the data that there has been a change in motion in the space, the IoT event hub can push the data and the determined change to the notification API so that all subscribed clients can show the data to their users.

In one example a client application can connect to the sensor SignalR hub (902, FIG. 9). The client application can look for the latest sensor data 600 for a given area of interest, such as a building. The notification API service can then go and retrieve this information from the Redis cache (906, FIG. 9). The service can do some quick processing to ensure the data is accurate. For example, motion in a room can be determined by a history looking back 2 minutes in time for any motion events. If any motion events are seen in that 2 minute window, then it is sent to the client application that there was motion in that specific room. This motion information can also be combined with electronic scheduling or booking information for the room and predictive analysis can be applied. The predictive analysis can determine whether a room that is empty (no motion detected) but booked will stay that way. Below is a code sample that shows the data abstraction system 610 processing the data to return to the client application. The data abstraction system 610 can receive a list of logical locations and can use the management system 606 data to find out the sensor data that belongs to those locations. The data abstraction system 610 can then validate that the data is correct and depending on the group type, can average the data.

```
public async Task<List<KeyValuePair<int,
List<SensorData>>>> GetAllSensorData(List<int> fpids, bool
IsCelsius)
        {
                List<KeyValuePair<int, List<SensorData>>> result =
new List<KeyValuePair<int, List<SensorData>>>( );
using(var db = new SensorContext( ))
{
                var sensorGroups = fpids.Select(id =>
    GetSensorGroups(id,false).Result);
    var allSensorGroups = sensorGroups.SelectMany(sgs
=> sgs);
    var sensorIds = allSensorGroups.SelectMany(sg =>
sg.Sensors).Select(s => s.Id);
    var recentData = db.RecentSensorData.Include(s =>
s.SourceSensor).Where(s =>
sensorIds.Contains(s.SourceSensor.Id)).ToList( );
    Parallel.ForEach(sensorGroups, sensorGroupsList =>
    {
        var data = new List<SensorData>( );
        var sg = sensorGroupsList.FirstOrDefault( );
        if (sensorGroupsList != null &&
sensorGroupsList.Count > 0)
        {
                var fpid =
sensorGroupsList.FirstOrDefault( ).FloorPlanId;
                Parallel.ForEach(sensorGroupsList,
            sensorGroup =>
                {
                    var groupIds =
                sensorGroup.Sensors.Select(s => s.Id);
                    var sensorData = recentData.Where(s
                => groupIds.Contains(s.SourceSensor.Id));
                    if (sensorData != null &&
                sensorData.Count( ) > 0)
                    {
                        switch (sensorGroup.Type)
                        {
                            case GroupType.Average:
                            //Just use first sensor in
                group to get needed values (FPID,
SensorType, InsertDate)
                                var sensor =
                            sensorData.FirstOrDefau
                            lt( );
                            string averagedValue =
"Error";
                                if (sensor != null)
                                {
                                    switch
(sensor.SourceSensor.Type
)
                                    {
                                        case
SensorType.Motion:
                                        bool outBool;
                                        var validBool =
sensorData.Where(s
=>
Boolean.TryParse(s.V
alue, out outBool));
                                        if (validBool.Count( ) >
0)
                                        {
                                            averagedValue
= sensorData.Any(s
=>
s.Value.Equals(Boole
an.TrueString)).ToStri
ng( );
}
break;
default:
                                            double
outValue;
                                                var validDouble
=
sensorData.Where(s
=>
Double.TryParse(s.V
alue, out outValue));
```

```
                      if
                      (validDouble.Coun
                      t( ) > 0)
                      {
                         averaged
                      Value =
                      validDouble.Av
                      erage(s =>
                      Convert.ToDou
                      ble(s.Value)).T
                      oString( );
                      }
                      break;
                   }
                   data.Add(CreateSensorDat
            a(averagedValue,
            sensor.SourceSensor.FloorPlanId,
            sensor.InsertDate,
            sensor.SourceSensor.Type,
            sensor.SourceSensor.Id,
            IsCelsius));
                }
                break;
                case GroupType.Collection:
                      data.AddRange(sensorD
                ata.Select(s =>
                CreateSensorData(s.Value,
                s.SourceSensor.FloorPlanId,
                s.InsertDate,
                s.SourceSensor.Type,
                s.SourceSensor.Id,
                IsCelsius)).ToList( ));
                break;
                default:
                break;
             }
          }
       });
       result.Add(new KeyValuePair<int,
  List<SensorData>>(fpid, data));
       }
    });
}
    return result;
}
```

In some implementations the management system 606 can be implemented as software running on an embedded device, such as IoT gateway 110 that can communicate with cloud services (e.g., physical environment management cloud services (112, FIG. 1) for configuration information, health status reporting, and/or remote management. The embedded device can ask the cloud service for its configuration. Each device can be registered in the cloud service. The embedded device can use that configuration to understand what it is supposed to be and do. The embedded device can also submit a health status to the cloud service so that administrators can monitor in real time the health of the system and devices of the system. The embedded device can also listen for commands from the physical environment cloud service that it (e.g., the embedded device) can then execute. The management system 606 can also use the data processing system 608 and data abstraction system 610 to process and action health data sent up by an individual embedded device.

FIG. 10 is an example high level mapping of data and the abstractions of an overall sensor processing system 602. In this case, the sensor processing system is organized into device configuration abstraction 1002, data storage abstraction 1004, and/or client abstractions 1006. Lower level concepts such as IoT gateway 110 to sensor 108 relations can be pushed out to the IoT gateway as indicated by device configuration abstraction 1002. Data (e.g., recent sensor data 1008 and/or historical sensor data 1010) can then be mapped to the sensors themselves as part of the data storage abstraction 1004. These mappings can be grouped up into sensor groups 1012 to provide the client abstractions for mapping sensor data 600 to physical locations 1014 and/or logical locations 1016 as part of the client abstractions 1006.

Figure 6:
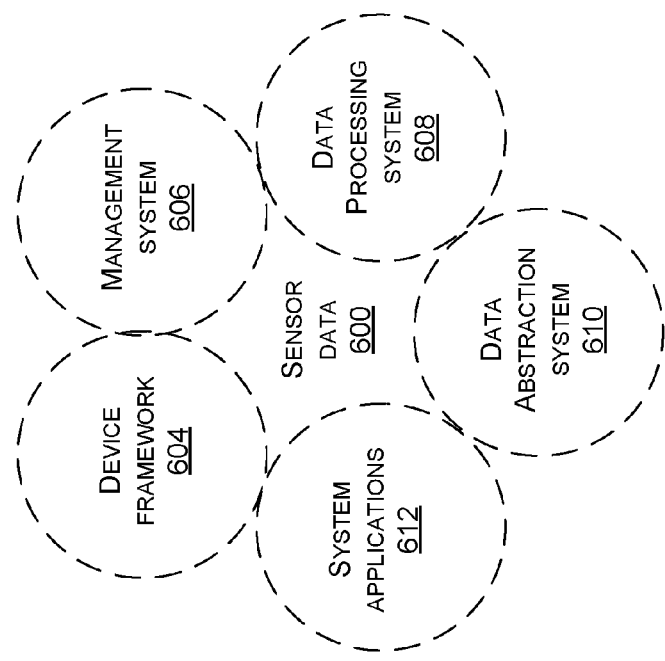

The discussed sensor 108 and/or IoT gateways 110 can be deployed in accordance with the sensor processing system 602 of FIG. 6. In one example, an IoT gateway 110 can be embedded in the ceiling of a conference room at an entity. This IoT gateway can turn on and start the device framework 604. The IoT gateway can reach a REST endpoint where the device asks for its configuration, passing up its media access control (MAC) address or other secured unique identifier/GUID so it can be recognized by the sensor processing system 602. The sensor processing system can then pass down the IoT gateway's sensor configuration and the hostname the IoT gateway should give itself. The IoT gateway can take this sensor configuration and start reading data from the sensors that it has been told are attached to it and can push that sensor data 600 to data processing system 608.

For example, a number of IoT gateways 110 might need to have some OS updates installed (or firmware updates especially in instances where a gateway is not running a full OS) on them and be restarted for the updates to take effect.

The management system 606 can send requests to each of the IoT gateways at once, pushing the software updates and the restart command. Individual IoT gateways can then install the updated software package and restart as requested.

In one case, an individual IoT gateway 110 can send its system logs to the management system 606 in real time. The individual IoT gateway can also periodically (such as every minute) send pings (called a heartbeat) to the management system. The pings can include the current IP address of the individual IoT gateway. The management system can use the pinging (or lack of pings) as an indication whether any of the IoT gateways under its control have gone offline. If an individual IoT gateway has gone offline, the management system can take an action, such as alerting an administrator if any IoT gateway has missed a heartbeat ping and give the administrator the up-to-date system logs for that IoT gateway. The management system can also monitor in real time the logs the IoT gateway are submitting and look for patterns in errors. For instance, the management system can use machine learning to look for patterns in errors that may occur on the IoT gateway and determine how that correlates to the potential for an individual IoT gateway to go offline.

For example, the management system 606 may notice a trend that a certain error is reported in a IoT gateway 110's log and within five minutes of this error being reported, the device goes offline. In data processing system 608, this data can be analyzed to catch these errors and send this data to the management system 606. The management system can then send a command to the IoT gateway and/or other IoT gateways that has been found to fix the issue of the IoT gateway going offline from this error before the device and/or the other devices actually go offline.

For example, on the IoT gateway 110 manifest as a Raspberry Pi 2 (which in this example is running a version of Linux called Raspbian), a pipe can be created. This pipe can be written to by the system log (e.g., rsyslog) component by updating the configuration of the system log to write data to this pipe. The pipe can then be listened to by a C# application run on the Raspberry Pi 2 using Mono or another application written in an alternative programming language such as Python. This application can push all data read from the pipe to the IoT event hub 802 where the data can be processed in real time and stored in long term storage. This concept could be expanded to a Windows operating system device (e.g., Windows IoT Core or full Windows desktop OS) by tapping into the event viewer system and pushing those logs to the event hub for processing and storage. Similar configurations can be applied to Apple and/or Android devices, among others—as well as specialized microprocessor based implementations that do not run a full-fledged operating system The discussion above can provide information about an area of interest (e.g., physical environment). Client solutions can relate to surfacing some or all of that information to individual users who might be interested in the information. The client solution designs can include display of sensor data 600 overlaid on a visual representation of the physical environment in real time or with predefined delays with the ability for end-user interaction with the experience.

The client solution can benefit from predictive analysis involving the sensor data 600 alone and/or in combination with other data. For instance, predictive analysis can offer information about what areas might remain quiet and what rooms that are booked might actually remain unoccupied due to high prediction probability the attendees won't show up. The other data can include proximity information, among others. For example, use of proximity sensor solutions to determine which employees are currently in the building is shown below. Proximity sensor solutions can also be used to determine who is sitting at a specific open floor plan seat or in a specific room, and also to better understand space and building resource utilization.

For example, multiple types of data can be overlaid or otherwise utilized on a single graphical user interface. For instance, a graphical user interface can overlay sensor data and floor plan data. In one such example environmental data that can be obtained by sensors 108, such as area/room occupancy and motion, sound level 2 data, temperature, brightness, etc. can be shown over a floor plan to inform users on environment conditions to make decisions.

In one example, the client application might show a floorplan of the entity's building which includes outlines of different kinds of meeting rooms and an open space seating area. This floorplan can also show the processed sensor data 600 that is collected in the raw form from sensors 108 that are imbedded in the space. Temperature, sound, and motion data can be shown on the different spaces, updating in real time so that if someone walks into a meeting room that room shows as occupied on the client application. One such scenario is shown in FIG. 11A.

Figure 11A:
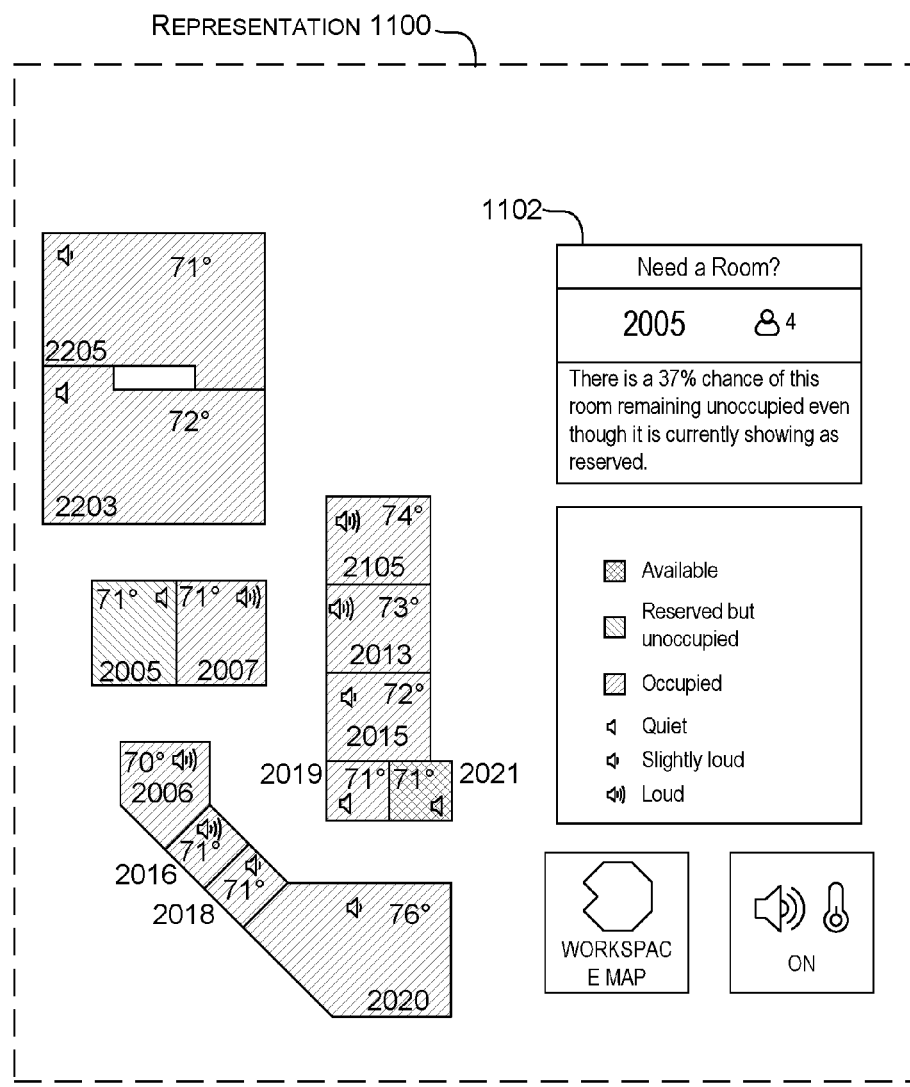
FIGS. 11A-11C show example IoT enabled representations in accordance with some implementations of the present concepts.
Figure 11B:
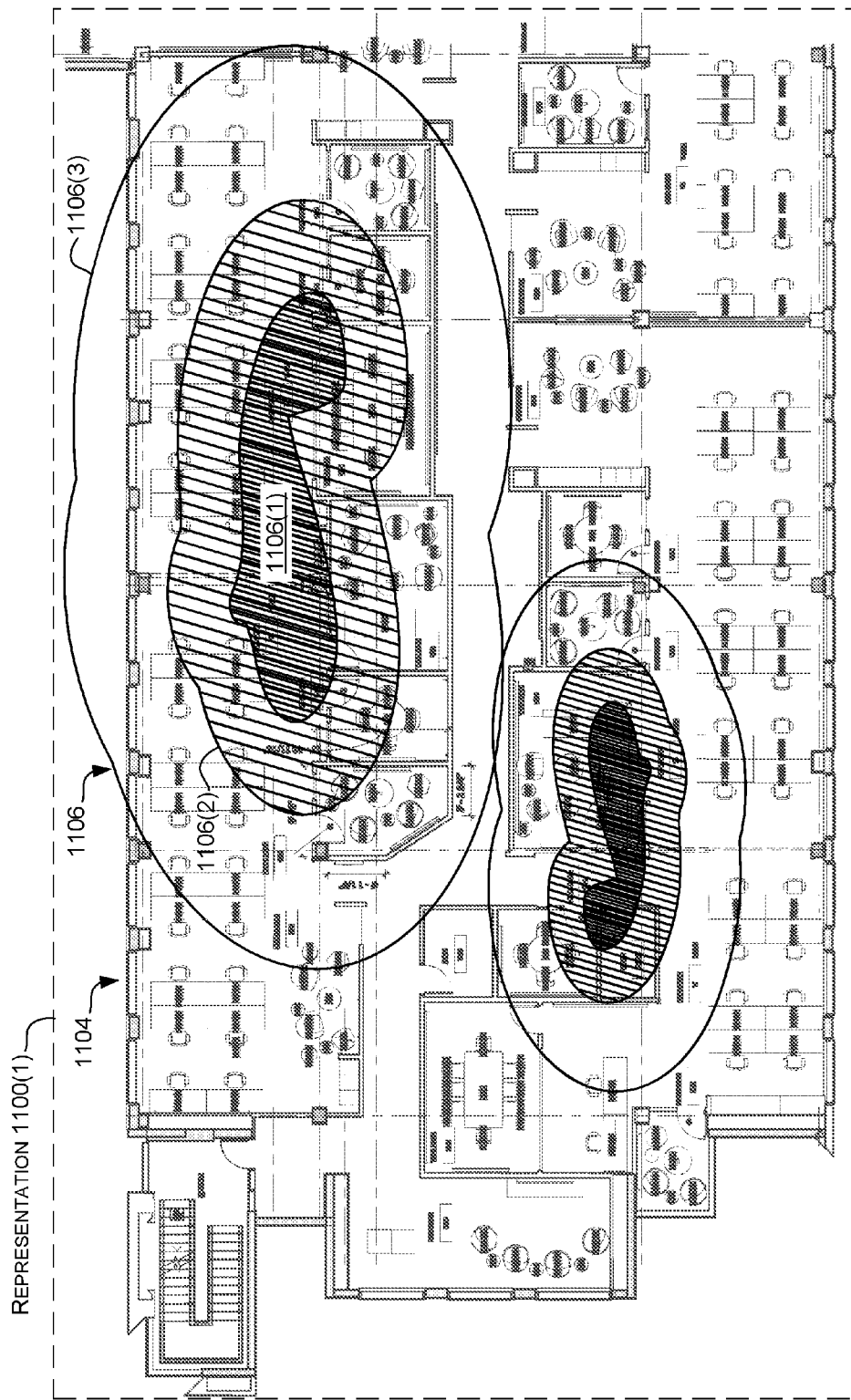
Figure 11C:
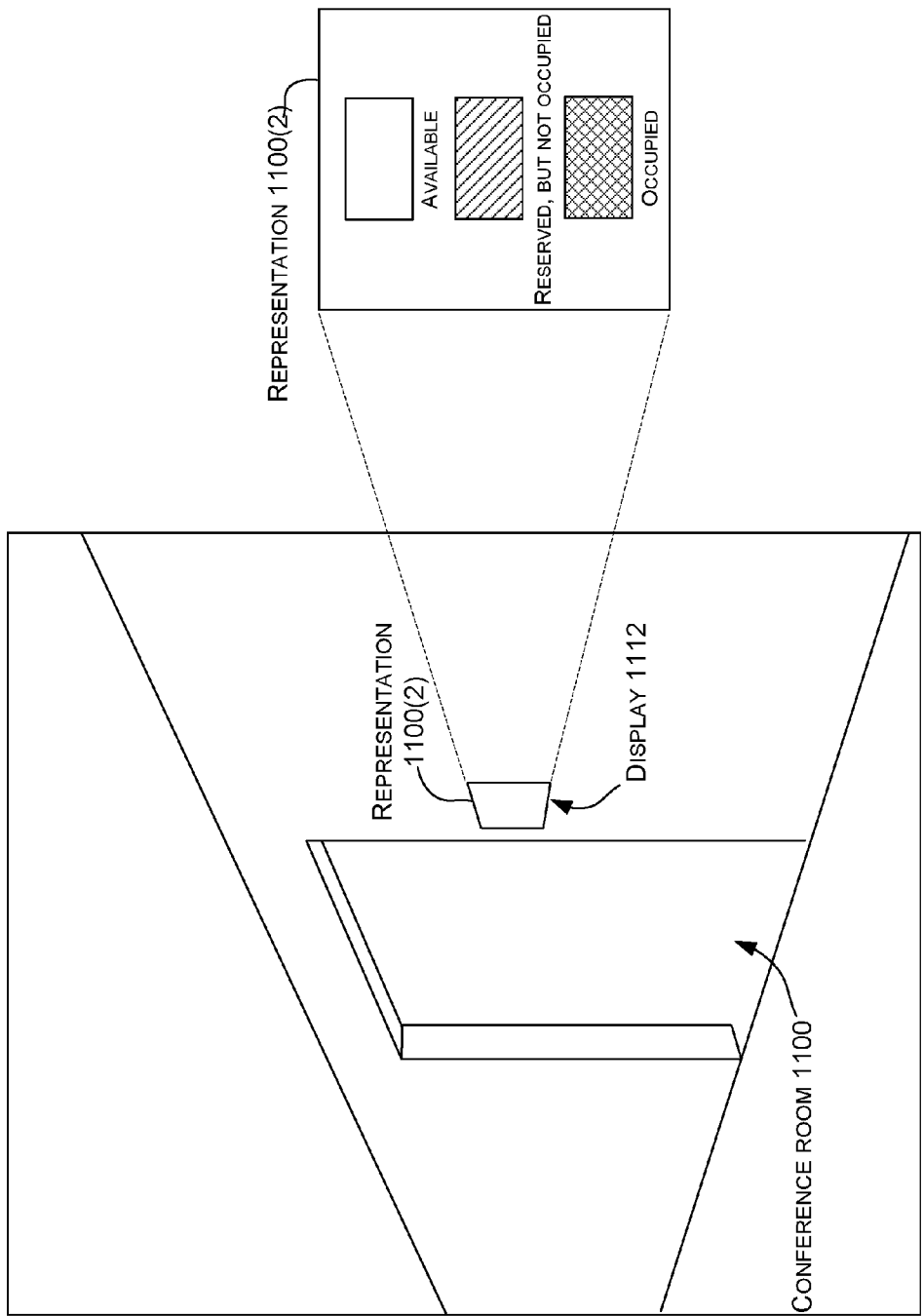

FIGS. 11A-11C show example representations of information that can be surfaced by employing the present concepts. FIG. 11A relates to an end user (e.g., client scenario), FIG. 11B relates to a facilities administration scenario, and FIG. 11C relates to a feedback scenario where the information is presented proximate to the area of interest.

FIG. 11A shows a representation 1100 of a physical environment; in this case a building. The representation can be generated by a client application and presented as a physical environment management user interface (114, FIG. 1). The representation 1100 can include both sensor related data 600 and other data. In this example, the other data can include a representation of rooms in the building as derived from blue prints or other sources. The other data can also include scheduling data for the rooms derived from a calendaring or scheduling application. The sensor related data can include temperature data, and noise (e.g., audio) data which are sensed in the rooms. The combination of the sensor data with other data can provide more useful information than can be obtained from either type of information alone. For instance, if the user needs a room for a meeting but all the rooms are booked, the combined information can show rooms that are booked but are unoccupied (based upon sensed noise and/or motion data). In this case, the representation goes a step further and makes a prediction at 1102 about a probability of a future state of the physical environment. In this example, the prediction is a probability that room 2005, which is booked but unoccupied, will remain unoccupied. The user can utilize this information to decide which room to try to use for his/her meeting.

In some implementations the client application can provide visual reporting of sensor data 600, such as through animated heat maps overlaid on top of a visual representation of the physical environment either in real time or historical playback of a defined time period. These can be used by facilities and building administrators to better understand environmental conditions, such as occupancy, use of certain resources, energy consumption and comfort-related conditions, and more to make better decisions around the environment and/or to save costs. Such an example is shown in FIG. 11B.

The management system 606 outlined above can be driven from the user side by a device management application. (A device management application can be viewed as a client application that is targeted at a specific subset of users, such as facilities administrators.) This device management application can combine real time monitoring of devices live in the system as well as the ability to add/update/delete devices in the sensor processing system 602. This device management application also can integrate via IoT Hub, (or similar product) into other enterprise management products, such as Microsoft Operations Management Suite (OMS) or ServiceNow, to have a single view across different device categories including IoT devices and to trigger events from that central dashboard.

For example, an administrator who is looking to spin up a new building with IoT gateways 110 can come into this device management application where he/she can enter information relating to the new building. This information can include entering the building into the system; name, address, GPS location, etc. Then device information can be added into the management application; MAC address, device type, building, etc. Sensors 108 can be added to the management application. For instance, information about the type of sensor, the port the sensor will be attached to, poll rate, and/or what IoT device the sensor will be attached to, among others, can be added. Sensor groups can then be created (See FIG. 10). The sensor groups can be viewed as purely logical groupings of sensors that allow a physical space to be collated into a single representation that can be displayed on a map, for example. Once all this information has been entered, a schematic can be created. The schematic can have various uses. For instance, the schematic can be printed out and used as a guide for someone to go and install all the physical devices (e.g., IoT devices and/or sensors) into a building or other area of interest. When the installer turns on the IoT device, the IoT device can pull their configurations from the management system 606.

In one such example, an administrator may want to monitor the health of an individual IoT gateway device 110 (and/or multiple IoT gateways) and the data 600 the IoT gateway is reading from its sensors 108. The administrator can do this by looking at the hardware health information that is sent to the management system 606 by the IoT gateway. The data displayed to the administrator can include a quick glance of overall system health, providing useful data in a quick to read and understand form, such as listing out IoT gateways that are offline and when they were last seen online. The administrator can select any IoT gateway, online or offline, and get additional information such as the system logs being reported by the IoT gateway, the sensors attached to the IoT gateway and the data those sensors are reporting, and/or the current IP address of the IoT gateway, and provide the ability for the administrator to send a command to the IoT gateway via the management system.

To summarize, some implementations can include an IoT hardware level that can include embedded IoT gateways 110 and/or sensors 108. These implementations can also include software/firmware that can run on the IoT gateways. In some examples, this software/firmware that runs on the embedded IoT gateways can receive data from the associated sensors. The received sensor data can be processed and pushed to a remote processor, such as physical environment management cloud service (112, FIG. 1). For example, a .NET Application "PiSense" can run on IoT gateways, such as Raspberry Pis, using Mono. This application can intelligently push data to an IoT hub service (e.g., IoT event hub 802, FIG. 8) on a specified interval and/or when a sensor state changes.

In some implementations, this software/firmware can run on a IoT gateway 110 and pull configuration data from the physical environment management cloud service (112, FIG. 1). This can provide the IoT gateway with useful metadata and configuration data on its configuration and related parameters. More description of this aspect is described below in relation to the physical environment management cloud service.

The software/firmware can also provide IoT hardware health monitoring and manageability. For instance, this health monitoring and management can be accomplished on the IoT gateways 110 and/or on the physical environment management cloud services 112.

For example, IoT gateways 110 can communicate health and status metrics, such as an internet protocol address, CPU load, memory utilization, disk space, etc. to the cloud service where the information can be captured, for use in logging and real time monitoring. The physical environment management cloud services 112 can also track sensor reads from the IoT gateway to ensure sensors 108 are functioning and returning data properly and/or that the data makes sense/is not out of value—which, if an issue, can indicate that a sensor is acting up or misconfigured.

The physical environment management cloud services 112 can also apply machine learning to the data collected from IoT gateways 110 to identify IoT gateways that are in or close to bad health based on patterns. In real time the physical environment management cloud services can also take action based on the current health data of an IoT gateway such as an email alert or sending a command to the IoT gateway to restore it to good health like a restart in an automated fashion.

Client applications for the IoT gateway can push logs to the physical environment cloud service. The logs can relate to core OS applications as well as the applications interacting with the sensors and/or the physical environment management cloud services 112. For example, the client applications can report an error reading a motion sensor 306 or a microphone 302. These logs, like health metrics, can be used both historically and in real time to provide insights. For example, they can be used to determine if a sensor 108 has gone bad (e.g., is malfunctioning in some way).

In one example, the IoT gateway 110 is manifest as a Raspberry Pi that is configured with a hardware GrovePi board to facilitate reading digital/analog sensors. Other sensors can be attached wirelessly and via USB and other wired protocols. The latest Raspbian OS can be installed along with Mono to run .NET and the drivers for the GrovePi and other devices. Software/firmware such as PiSense, a .NET console application, can be installed. PiSense can manage multiple functions. Example functions can include device configuration. For instance, the IoT gateway can connect to the environment management cloud services 112 and can pass up an ID like a MAC address. The environment management cloud services 112 can return back various configuration options like hostname as well as the ports, poll rates, and/or other configuration options for connected sensors. The algorithm below can process received device information.

```
private void assignSensorsToServices(DeviceInformation
deviceInformation)
    {
        List<SensorModel> EnoceanSensors = new
List<SensorModel>( );
        foreach (SensorModel sensor in
deviceInformation.Sensors)
        {
```

```
            switch (sensor.Type)
            {
                case SensorType.GrovePI:
                    switch (sensor.DataType)
                    {
                        case SensorDataType.Motion:
                            this.addMotionSensor(sensor,
this._isTestMode);
                            break;
                        case SensorDataType.Temperature:
                            this.addTemperatureHumiditySensor(sensor,
deviceInformation.Sensors, this._isTestMode);
                            break;
                        case SensorDataType.Humidity:
                            //Do nothing here as the humidity sensor is
handled by the temperature sensor service
                            break;
                        case SensorDataType.Sound:
                            this.addSoundSensor(sensor,
this._isTestMode);
                            break;
                        case SensorDataType.Light:
                            this.addLightSensor(sensor,
this._isTestMode);
                            break;
                        default:
                            break;
                    }
                    break;
                case SensorType.GrovePIPro:
                    switch (sensor.DataType)
                    {
                        case SensorDataType.Temperature:
this.addTemperatureHumidityProSensor(sensor,
deviceInformation.Sensors, this._isTestMode);
                            break;
                        case SensorDataType.Humidity:
                            //Do nothing here as the humidity sensor is
handled by the temperature sensor service
                            break;
                        default:
                            break;
                    }
                    break;
                case SensorType.Enocean:
                    EnoceanSensors.Add(sensor);
                    break;
                default:
                    break;
            }
        }
        addEnoceanSensors(EnoceanSensors,this._isTestMode);
    }
```

Another function example can relate to data collection. For instance, using the configuration above PiSense can connect to and read sensors 108 using OS level commands, scripts, functions and/or other programs depending on sensor type and configuration data. The algorithms below can illustrate data collection flow.

```
    public override string readSensorValue( )
    {
        string reading = ErrorCodes.GenericError;
        try
        {
            reading =
_motionSensorReader.ReadMotionData(window, this.sensor.Port);
            if (reading.Equals(ErrorCodes.GenericError))
            {
                errorCount += 1;
            }
            else
            {
                //no error, parse values
                int newActiveCount = 0;
                int newInactiveCount = 0;
                int newErrorCount = 0;
                string[ ] parsedValues =
reading.Split(',').Select(sValue => sValue.Trim( )).ToArray( );
                if (parsedValues.Length >= 1)
                    Int32.TryParse(parsedValues[0], out
newActiveCount);
                if (parsedValues.Length >= 2)
                    Int32.TryParse(parsedValues[1], out
newInactiveCount);
                if (parsedValues.Length >= 3)
                    Int32.TryParse(parsedValues[2], out
newErrorCount);
                activeCount += newActiveCount;
                inactiveCount += newInactiveCount;
                errorCount += newErrorCount;
            }
            //Motion is a true false value, so if motion was detected,
then return true value.
            reading = (activeCount > 0).ToString( );
            if (activeCount == 0 && inactiveCount == 0 &&
errorCount > 0)
            {
                reading = ErrorCodes.GenericError;
            }
        }
        catch (Exception ex)
        {
            this.log.WriteException(ex,
"MotionSensorService::readSensorValue");
        }
        return reading;
    }
    public string ReadMotionData(int pollrate, string port)
    {
        //GrovePi uses a shared buffer to store results, so this
needs to be locked so its not run at the same time by multiple threads
        string result = ErrorCodes.GenericError;
        lock (SensorLocks.GrovePiSensorLock)
        {
            result =
bashProcessManager.RunPythonScript("/home/pi/PiSense/SensorScrip
ts/MotionGroveRead.py", true, pollrate.ToString( ), port);
        }
        //sometimes Grove libs print IOError so we check for that
        if (!String.IsNullOrWhiteSpace(result) &&
result.Contains("IOError"))
        {
            result = result.Replace("IOError", "");
        }
        if (result != null) { result = result.TrimEnd('\n', ' '); }
        return result;
    }
```

Another function example can relate to data transmission. In one such case, PiSense can connect to IoT hub (e.g., IoT event hub 802, FIG. 8) to submit collected sensor data 600, health metrics, logs and/or other relevant data streams for processing down the pipeline. The algorithms below can illustrate IoT hub transmission.

```
    public async Task PostSensorData(SensorRead sensorData)
    {
        if (!_isResettingConnection)
        {
            string data = JsonConvert.SerializeObject(sensorData);
            Message message = new Amqp.Message( )
            {
                BodySection = new Amqp.Framing.Data( )
                {
                    Binary =
System.Text.Encoding.UTF8.GetBytes(data)
                }
            };
            message.MessageAnnotations = new
MessageAnnotations( );
```

```
        try
        {
            await _senderLink.SendAsync(message);
        }
        catch (Exception e)
        {
            _log.WriteException(e,
"AzureEventHubSensorClient::PostSensorData");
            resetConnection( );
        }
    }
    else
    {
        await Task.Delay(200);
    }
}
```

Another function example can relate to command and control. For instance, PiSense can listen to IoT event hub (e.g., 802, FIG. 8) for commands driven by various service side components using these to update its configuration, run commands, deploy new firmware, and other custom jobs.

FIG. 11B shows a representation 1100(1) of a physical environment; in this case a building. The representation can include a building layout 1104 and sensor derived information 1106. In this example, the sensor derived information 1106 relates to temperature. The highest temperatures are indicated at 1106(1), middle temperatures are indicated at 1106(2) and lower temperatures are shown at 1106(3). The representation can be generated for various users; notably the representation may be useful to a facilities manager, among others. Of course, other types of sensor derived information can be displayed and/or multiple types of sensor derived information can be displayed. FIGS. 11A and 11B show example representations that can be presented to users regardless of their location (e.g., at the physical environment or remote from the physical environment). FIG. 11C shows an example representation that can be presented at (e.g., proximate to) the physical environment or location of interest.

FIG. 11C shows a representation 1100(2) that can be presented proximate to the area of interest. In this example, the area of interest is a conference room 1110. In this case the representation is presented on a display 1112 outside the conference room. The representation 1100(2) can include both sensor related data 600 and other data. In this case, the other data is scheduling or calendaring data relating to the conference room. The combination of the sensor data and the scheduling data can provide more useful information than can be obtained from either type of information alone. For instance, the representation 1100(2) can distinguish between an available condition, a scheduled but unoccupied room, and an occupied room.

FIGS. 11A-11C show several examples of how sensor related information (e.g., sensor derived information) alone or in combination with other data can be presented to users. Other representations are contemplated. For instance, representations can be generated for specific user groups. The representations can be generated by a single application or by different applications targeted to individual user groups. These user groups can include at least: 1) End Users/Employees—An app experience that presents environmental data to help end user productivity, such as a floor plan view with rooms that are unoccupied, noise conditions, etc. in real time. 2) Facilities administrator—An app experience that can include a heatmap overlayed on a floor plan for historical reporting, trends, etc. of environment. 3) Facilities Installers—An app for installers to scan QR codes/onboard sensors into the system. 4) IT Admin—A client for IT administrators to manage devices, updates, etc.

FIG. 12 shows another inventive aspect relating to proximity-based sensing system 1200. The proximity based sensing system can determine the location of a person or physical asset. The illustrated proximity based sensing system includes beacons 1202 and readers 1204, which can work together in cooperation with data processing system 608. Beacons 1202 can be manifest as battery powered devices with a radio. Beacons can also be included in another device such as a mobile phone. An individual may carry a beacon 1202. Readers 1204 can be placed in multiple areas to detect the presence of the beacon 1202, which is tethered to the individual. Radio technologies such as Bluetooth Low Energy (BTLE) or Wireless Fidelity (Wi-Fi) can be utilized by both beacons and readers. Upon detection of a beacon 1202, the reader 1204 can convey attributes pertaining to signal strength. The signal strength can serve as a proxy for distance, to the data processing component. Multiple readers may be used together to triangulate. If a beacon is deemed to be within a specific range via rule logic, an event can be triggered. Example event scenarios are described below.

In one example event scenario, a person (e.g., individual) possessing a beacon 1202, who is a meeting organizer for a meeting scheduled to begin now, walks into a conference room. The reader(s) 1204 can detect the person's presence and automatically launch teleconferencing or video conferencing sessions (such as using Skype or Skype for Business, Facetime, etc.), and automatically start presenting (such as on a Surface Hub, projection, or other device) content linked or attached to the meeting invitation (such as a PowerPoint document either attached or hosted on a cloud service such as OneDrive or OneDrive for Business, DropBox, etc.).

Another example event scenario involves a person possessing a beacon 1202, who is the employee for the entity, walks into an office or room and is detected as in range by readers(s) 1204. The person's personal preferences, which were previously collected and entered into a system, are retrieved and the environment adjusts to those preferences—such as changing the temperature or light levels of the office the person is in, or other environmental conditions.

Another example event scenario involves an automobile with a beacon 1202. The automobile enters a garage, and displays light up to direct the driver to an available parking spot using a combination of free car parking spot detection technologies and/or readers 1204 to determine the current location of the car.

Another example event scenario involves a person possessing a beacon 1202 leaving a location in which they left their tablet or laptop power supply. The power supply also has a beacon 1202, and the location has reader(s) 1204. Upon leaving that location, the person is alerted that they left their power supply behind (such as through a mobile phone location) by way of calculating the increased distance between the two objects, and processing other logic such as time of day and by looking at the events calendar/schedule of that individual (such as through integration with Microsoft Exchange).

Another example event scenario involves a person possessing a beacon 1202 having a meeting in a specific room/location. Using their mobile device, they are able to receive step-by-step indoor navigation directions using a combination of readers 1204 to triangulate their location. They also can see the locations of their colleagues who opted in to share their location. Notifications can even be provided via business logic for when two people are nearby, such as a café, to suggest that they may want to meet for lunch.

Another example event scenario involves building administrators who are able to use location tracking of people at the entity to provide detailed information for security, disaster response, and facilities planning purposes. Of course, such tracking can be conducted after the people are notified and authorize the tracking. The tracking can be accomplished in a manner that protects the privacy of the people involved.

Another example event scenario involves people in an open floor plan office. The people can determine the current location (down to the seat of meeting room) of an individual person using beacon 1202 and reader 1204 technology.

As mentioned above, physical environment management cloud service 112 can provide the IoT gateway 110 with metadata and configuration data. The physical environment management cloud service can also include software mechanisms to catalog inventory of IoT gateways and/or sensors 108 across an enterprise. Potentially more importantly, the physical environment management cloud service can use that knowledge to create a centralized point of logic to make determinations on how to interpret various sensor data 600 properly in order to return meaningful results to software client apps.

In some implementations, the physical environment management cloud service 112 can manage and provides configuration data on the sensors 108 attached to an IoT gateway 110. For example, the physical environment management cloud service can tell an IoT gateway device that is configured in the system to have four sensors 108 attached to it of various types. The physical environment management cloud service can also tell the IoT gateway what communication protocol to use for each sensor, the poll rate, physical connection port the sensor is attached to, and/or any other specific metadata for a given sensor type. This can enable the ability to centrally configure and manage IoT gateways (and their sensors) using the physical environment management cloud service.

The physical environment management cloud service 112 can also catalog the physical space an IoT gateway 110 (e.g., to the device's ID) is located in through a logical mapping of a hierarchal set of physical locations. For example, IoT gateway 001 is located in Puget Sound->Building 122->Floor 3->Conf Room 3117-> and has 8 sensors attached, 4 to Sensor Enclosure A located in the rear left of the room on ceiling tile 3 and 4 attached to Sensor Enclosure B located in the rear right of the room on ceiling tile 8.

In some cases, many sensors are mapped to a space. In the example above this is something very discrete like a set 'x' of sensors at a given location 'y'. This can be done not just to catalog deployed devices, but also so that sensor data 600 can be related to a "human readable/client" concept of a space by client applications. For example, a large conference room may need multiple motion sensors 306 to capture motion for the room. By having an intelligent cloud service that knows what sensors 108 are where, this abstracts the need for software clients to have intimate knowledge of how sensors are associated to spaces and how to interpret the data. In this way, a software client can request motion data for Conf Room 3117, and since the physical environment management cloud service 112 understands what sensors are where, in the case of motion so long as any sensor in that room shows recent activity it can correctly inform the client application that the room is occupied. Similarly, multiple temperate sensors may be averaged to provide a room average temperature or temperature by zone for larger rooms. These relations can also provide a granularity of data at any level in the space hierarchy. This can also enable a single point of logic processing which uses space and sensor type to apply different aggregation strategies (e.g., any active sensor in motion indicates occupancy; aggregation and averages can be used for temperature, sound, and light—or alternatively zoning within a room, etc.).

In some configurations the physical environment management cloud service 112 can house management REST APIs. For instance, using ASP.NET, WebAPI framework and entity framework can create controllers that allow a Create Update, Delete (CRUD) and other complex operations to be completed against the data model which is stored on physical environment cloud resources. An example algorithm from a controller for the API is provided below.

```
public class SpaceManagementController : ApiController
{
    private readonly ISpaceRepository _spaceRepo;
    private readonly ICacheManagerHelper _cacheManager;
    public SpaceManagementController(ISpaceRepository spaceRepo, ICacheManagerHelper cacheManager)
    {
        _spaceRepo = spaceRepo;
        _cacheManager = cacheManager;
    }
    [HttpGet]
    [Route("get/all")]
    public IHttpActionResult GetAllSpaces( )
    {
        List<Space> data = null;
        try
        {
            data = _spaceRepo.GetAllSpaces( );
            if (data == null)
            {
                return InternalServerError(new Exception("Failed to get spaces"));
            }
            else
            {
                return Ok(data.AsQueryable( ));
            }
        }
        catch (Exception ex)
        {
            return InternalServerError(ex);
        }
    }
}
```

In some implementations, the data abstraction system 610 can consist of four main classes: users, sensors, devices, and/or spaces (e.g., locations of interest), along with generic extended properties for each. Sensors 108 can be linked to IoT gateways, and both IoT gateways and sensors can be linked to spaces. Users can also be linked to spaces. This hierarchy can be used for both IoT gateway configuration as well as allowing clients to have a logical concept in which to correlate data to spaces.

Example algorithms for users, sensors, IoT gateways (e.g., devices), and sensors, respectively, are provided below.

```
public class User
{
    public Guid Id { get; set; }
    public string UPN { get; set; }
    public string FirstName { get; set; }
    public string LastName { get; set; }
    public string MetadataJSON { get; set; }
    [NotMapped]
```

```
            public Uri PhotoUri { get; set; }
            public string ManagerName { get; set; }
            [JsonIgnore]
            public virtual ICollection<Space> Spaces { get; set; }
            public virtual ICollection<OrionUpdate> OrionUpdates { get; set; }
        }
        public class Sensor
        {
            public Guid Id { get; set; }
            public string Port { get; set; }
            public int PollRate { get; set; }
            //FK
            public int DataTypeId { get; set; }
            public int TypeId { get; set; }
            public Guid DeviceId { get; set; }
            public Guid SpaceId { get; set; }
            //Navigation
            [JsonIgnore]
            public virtual SensorDataType DataType { get; set; }
            [JsonIgnore]
            public virtual SensorType Type { get; set; }
            public virtual Device Device { get; set; }
            public virtual Space Space { get; set; }
            [JsonIgnore] // temporary ignore
            public virtual ICollection<Filter> Filters { get; set; }
            [JsonIgnore]
            public virtual ICollection<Gain> Gains { get; set; }
            [JsonIgnore]
            public virtual ICollection<SensorExtendedProperty> ExtendedProperties {get; set;}
        }
        public class Device
        {
            public Guid Id { get; set; }
            public string MacAddress { get; set; }
            public string Name { get; set; }
            [JsonIgnore]
            public bool GoodHealth { get; set; }
            //FK
            public Guid? SpaceId { get; set;}
            [JsonIgnore]
            public Guid? EventHubConfigurationId { get; set; }
            public virtual Space Space { get; set; }
            [JsonIgnore]
            public virtual EventHubConfiguration EventHubConfiguration { get; set; }
            public virtual ICollection<Sensor> Sensors { get; set; }
        }
        public class Space
        {
            public Guid Id { get; set; }
            public string Name { get; set; }
            //FK
            public int SpaceTypeId { get; set; }
            public int? PhysicalSpaceTypeId { get; set; }
            public Guid? PhysicalLocationId { get; set; }
            public Guid? ParentSpaceId { get; set; }
            //Navigation
            public virtual SpaceType SpaceType { get; set; }
            public virtual PhysicalSpaceType PhysicalSpaceType { get; set; }
            public virtual PhysicalLocation PhysicalLocation { get; set; }
            public virtual Space Parent { get; set; }
            [JsonIgnore]
            public virtual ICollection<AccessRight> AccessRights { get; set; }
            public virtual ICollection<Sensor> Sensors { get; set; }
            public virtual ICollection<Device> Devices { get; set; }
            [JsonIgnore]
            public virtual ICollection<User> Users { get; set; }
            [JsonIgnore]
            public virtual ICollection<SpaceExtendedProperty> Extended Properties {get; set;}
            public virtual ICollection<Space> Children { get; set; }
            [JsonIgnore]
            public virtual ICollection<Order> Orders { get; set; }
            [JsonIgnore]
            public virtual ICollection<OrionUpdate> OrionUpdates { get; set; }
```
```
set; }
        }
```

The notification API (908, FIG. 9) can also interface with Redis cache 906 to cache the hierarchy of sensors 108 and spaces which allows average processing on the data. An example algorithm relating to cache population logic is provided below.

```
    private void ProcessSpacesToSpace(IEnumerable<IGrouping<Space, SpaceWithDataType>> spaceByParent)
    {
        do
        {
            foreach (var spaceGroup in spaceByParent)
            {
                var parentId = spaceGroup.Key.Id;
                var spaceByDataType = spaceGroup.GroupBy(s => s.DataType);
                foreach (var typeGroup in spaceByDataType)
                {
                    var type = (SensorDataTypeEnum)typeGroup.Key.Id;
                    var spaceIds = typeGroup.Select(s => s.Space.Id).ToList( );
                    _sensorCache.UpdateChildrenForSpace(parentId, spaceIds, type, false);
                    foreach(var id in spaceIds)
                    {
                        _sensorCache.updateEntityAncestry(id, new List<Guid> { parentId });
                    }
                }
            }
            spaceByParent = spaceByParent.Where(s => s.Key.Parent != null && s.Count( ) > 0).Select(s => new SpaceWithDataType(s.Key.Parent, s.FirstOrDefault( ).DataType)).GroupBy(s => s.Space.Parent);
        } while (spaceByParent.Count( ) > 0);
    }
    private void ProcessSensorsToSpace(IEnumerable<Sensor> sensors)
    {
        var sensorsBySpace = sensors.GroupBy(s => s.Space);
        foreach (var spaceGroup in sensorsBySpace)
        {
            var spaceId = spaceGroup.Key.Id;
            var sensorsByDataType = spaceGroup.GroupBy(s => s.DataType);
            foreach (var typeGroup in sensorsByDataType)
            {
                var dataType = (SensorDataTypeEnum)typeGroup.Key.Id;
                var sensorIds = typeGroup.Select(s => s.Id).ToList( );
                //Create children group for each type
                _sensorCache.UpdateChildrenForSpace(spaceId, sensorIds, dataType, false);
                //Create ancestor for each sensor
                foreach (var sensorId in sensorIds)
                {
                    _sensorCache.updateEntityAncestry(sensorId, new List<Guid> { spaceId });
                }
            }
        }
    }
```

In some cases, physical environment management cloud services 112 can act as a data processing engine (e.g., provide processor 806, FIG. 8). The data processing engine can facilitate rapid and scalable ingress, processing, and egress, of data. This can be part of data processing system (608, FIG. 8) which provides a mechanism to ingest data from IoT gateways 110 (and their sensors 108). Processing can then applied to the data and the processed data can then pushed into downstream components (808, FIG. 8).

In some configurations, the physical environment management cloud service (112, FIG. 1) can house a worker role. Data can be assigned a worker role that is configured as an event processor host for an IoT hub allowing it to receive messages from the IoT hub. The processor (806, FIG. 8) can process messages asynchronously using sets of chainable classes for logic to perform delta, averaging, and/or data transformation processing. These processing chains can be configured in a data table per data type. Recent data can be tracked in the Redis cache (906, FIG. 9), the hierarchy generated by management system 606 can be used to allow processing for sensors 108 as well as spaces they map to. Historical data can also be generated and stored in the historical data table storage (904, FIG. 9). In some configurations, the historical data can be stored as Blobs.

The processor (806, FIG. 8) can be viewed as the starting point of the process. The processor can take new values from sensors 108 and can engage the processing chains. The processor can generate a notification and send the notification to a notification service (e.g., notification API (908, FIG. 9)). The processor can process the moves up the space hierarchy following the same process. An example processor algorithm of sample code is provided below.

```
private void
ProcessSpacesToSpace(IEnumerable<IGrouping<Space,
SpaceWithDataType>> spaceByParent)
{
    do
    {
        foreach (var spaceGroup in spaceByParent)
        {
            var parentId = spaceGroup.Key.Id;
            var spaceByDataType = spaceGroup.GroupBy(s =>
s.DataType);
            foreach (var typeGroup in spaceByDataType)
            {
                var type =
(SensorDataTypeEnum)typeGroup.Key.Id;
                var spaceIds = typeGroup.Select(s =>
s.Space.Id).ToList( );
                _sensorCache.UpdateChildrenForSpace(parentId,
spaceIds, type, false);
                foreach(var id in spaceIds)
                {
                    _sensorCache.updateEntityAncestry(id, new
List<Guid> { parentId });
                }
            }
        }
        spaceByParent = spaceByParent.Where(s =>
s.Key.Parent != null && s.Count( ) > 0).Select(s => new
SpaceWithDataType(s.Key.Parent,
s.FirstOrDefault( ).DataType)).GroupBy(s => s.Space.Parent);
    } while (spaceByParent.Count( ) > 0);
}
private void ProcessSensorsToSpace(IEnumerable<Sensor>
sensors)
{
    var sensorsBySpace = sensors.GroupBy(s => s.Space);
    foreach (var spaceGroup in sensorsBySpace)
    {
        var spaceId = spaceGroup.Key.Id;
        var sensorsByDataType = spaceGroup.GroupBy(s =>
s.DataType);
        foreach (var typeGroup in sensorsByDataType)
        {
            var dataType =
(SensorDataTypeEnum)typeGroup.Key.Id;
            var sensorIds = typeGroup.Select(s => s.Id).ToList( );
            //Create children group for each type
            _sensorCache.UpdateChildrenForSpace(spaceId,
sensorIds, dataType, false);
            //Create ancestor for each sensor
            foreach (var sensorId in sensorIds)
            {
                _sensorCache.updateEntityAncestry(sensorId,
new List<Guid> { spaceId });
            }
        }
    }
}
```

Several processor abstractions are described below. A processor abstraction can be viewed as a class that processes a given data point. The data point can relate to various aspects, such as sensor type. Multiple values may be cached as recent data (1008, FIG. 10) to create a per sensor historical average, for example motion is determined over the past 3 values for better occupancy accuracy. An example processing chain algorithm is provided below. This example is used for temperature data. First the data is processed in the DoubleProcessor, then transformed in the CelsiusToFahrenheitProcessor.

```
public class DoubleProcessor : IReadingProcessor
{
    public string ProcessValues(StoredReadingData
cachedValues, BaseSensorConfig sensorConfig, SensorReading
sensorEvent)
    {
        string average = Constants.Error;
        double parseOut;
        var validDoubleSensors =
cachedValues.HistoricalRawData.Where(s =>
double.TryParse(s.ToString( ), out parseOut));
        if (validDoubleSensors.Count( ) > 0)
        {
            average = validDoubleSensors.Average(s =>
Convert.ToDouble(s.ToString( ))).ToString( );
        }
        return average;
    }
}
public class CelsiusToFahrenheitProcessor : IReadingProcessor
{
    public string ProcessValues(StoredReadingData
cachedValues, BaseSensorConfig sensorConfig, SensorReading
sensorEvent)
    {
        double parseOutput;
        if (double.TryParse(cachedValues.ProcessedValue, out
parseOutput))
        {
            return toFahrenheit(parseOutput).ToString("F2",
CultureInfo.CreateSpecificCulture("en-US"));
        }
        else
        {
            return Constants.Error;
        }
    }
    private double toFahrenheit(double celisius)
    {
        return celisius * 1.8d + 32d;
    }
}
```

An example algorithm provided below shows the DoubleSpaceProcessor. After processing data at a sensor level, the method can calculate changes up the hierarchy into the space where that sensor is.

```
public class DoubleSpaceProcessor : BaseSpaceProcessor
{
    public override Dictionary<Guid, StoredReadingData[ ]>
ProcessSpaces(string newValue, SensorReading sensorEvent,
BaseSensorConfig sensorConfig)
    {
```

```
                return BreadthFirstClimb(newValue, sensorEvent,
sensorConfig);
        }
        protected override string[ ]
calculateNewSpaceValue(Dictionary<Guid,StoredReadingData>
known Values,Guid childThatChanged,Guid
spaceId,SensorDataTypeEnum dataType,BaseSensorConfig
sensorConfig)
        {
            //Update this to refer to a general space instead of sensor
            var oldValue = _cacheManager.GetEntityValues(spaceId,
dataType,sensorConfig.ReadingStaleTimeout,sensorConfig.CircularBuff
erSize);
            List<double> childValues = getChildValues(knownValues,
childThatChanged, spaceId, dataType, sensorConfig);
            if (childValues.Count > 0)
            {
                double calculateValue = 0;
                foreach(double value in childValues)
                {
                    calculateValue += value;
                }
                calculateValue /= childValues.Count;
                return new string[ ]
{calculateValue.ToString( ),oldValue.ProcessedValue };
            }
            else
            {
                return new string[ ] { _error, oldValue.ProcessedValue };
            }
        }
        private List<double> getChildValues(Dictionary<Guid,
StoredReadingData> knownValues, Guid childThatChanged, Guid
spaceId, SensorDataTypeEnum dataType, BaseSensorConfig
sensorConfig)
        {
            var myChildren =
_cacheManager.GetChildrenForEntity(spaceId, dataType);
            var childValues = new List<double>( );
            foreach (Guid child in myChildren)
            {
                double processedValue;
                StoredReadingData processedReading;
                if (!knownValues.ContainsKey(child))
                {
                    processedReading =
_cacheManager.GetEntityValues(child, dataType,
sensorConfig.ReadingStaleTimeout,sensorConfig.CircularBufferSize);
                }
                else
                {
                    processedReading = knownValues[child];
                }
if(double.TryParse(processedReading.ProcessedValue,out
processedValue))//Note this filters out both corrupted data and explicit
"ERROR" values
                    childValues.Add(processedValue);
            }
            return childValues;
        }
```

Some implementations can employ a state processor (e.g., another abstracted processor), that can work over multiple sensor types to generate a computed state. For example, motion data and conference room reservation data can be processed as normal but then OccupancyStateProcessor can be used to determine the combined state of occupancy; occupied, reserved unoccupied, and/or unoccupied, among others. These states can be stored along with the separate streams and allow flexibility to create abstractions that combine data.

The notification engine can be viewed as logic that is used to determine if data has changed for a sensor 108 or space. Given configured delta parameters, it may be the last step to determine if a client notification should be triggered. An example notification engine algorithm is provided below.

```
class DoubleNotificationEngine : INotificationEngine
    {
        public SensorNotification GetSensorNotification(string
newValue, string oldValue, SensorReading sensorEvent,
BaseSensorConfig sensorConfig)
        {
            double newDouble;
            double oldDouble;
            if (!(Double.TryParse(newValue, out newDouble) &&
Double.TryParse(oldValue, out oldDouble)))
            {
                throw new FormatException( );
                //maybe different exception handling here
            }
            if (Math.Abs(newDouble – oldDouble) <
sensorConfig.SensorDelta)
            {
                return null;
            }
            SensorNotification notification = new
SensorNotification(sensorEvent, newValue);
            return notification;
        }
        public SensorNotification GetSensorNotification(string v1,
string v2, SensorReading sensorEvent, BaseSensorConfig
sensorConfig, Guid key)
        {
            double newDouble;
            double oldDouble;
            //v1 v2 name change
            if (!(Double.TryParse(v1, out newDouble) &&
Double.TryParse(v2, out oldDouble)))
            {
                throw new FormatException( );
                //maybe different exception handling here
            }
            double sensorDelta = 0;//get from config
            if (Math.Abs(newDouble – oldDouble) < sensorDelta)
            {
                return null;
            }
            SensorNotification notification = new
SensorNotification(sensorEvent, v2, key);
            return notification;
        }
    }
```

In some cases, recent data can be stored in a Redis cache (906, FIG. 9) along with the hierarchy generated by the management API (e.g., the management system 606). In one implementation, the data and hierarchy can be expressed in the form EntityID_Type=>StoredReading. This formula can hold the recent values for a sensor 108 as detailed in the example algorithm below. In this case, EntityID_Type_Notification=>String can hold the client notification value for both sensor and space, and EntityID_State=>Dictionary<string, string>can map state name to current state value.

```
public class StoredReadingData
    {
        public StoredReadingData( )
        {
        }
        [JsonConstructor]
        public StoredReadingData(IEnumerable<string>
HistoricalRawData)
        {
            if (HistoricalRawData != null)
                this.HistoricalRawData = new
CircularBuffer<string>(HistoricalRawData);
            else
                this.HistoricalRawData = newCircularBuffer<string>( );
        }
        public StoredReadingData(StoredReadingData oldData, int
circularBufferSize)
```

```
    {
        HistoricalRawData = new
CircularBuffer<string>(oldData.HistoricalRawData.ToList( ));
        HistoricalRawData.Size = circularBufferSize;
    }
    public CircularBuffer<string> HistoricalRawData { get; set; }
    public string ProcessedValue { get; set; }
}
```

Some implementations can store historical data in Blob storage under the structure: <EntityId|Sensor/Space ID>/<SensorDataType>/<Date|ddMMyyyy>/<Hour|0-23>/<BinaryTime>.json. This can allow for quick access to both sensor and space data. Raw, processed, and/or notification values can be captured.

As discussed relative to IoT enabled enterprise management systems (100, FIG. 1), physical environment management cloud services 112 can support health monitoring and manageability for IoT gateway devices 110. The management system (606, FIG. 6) can consist of an API and sets of worker roles, which monitor the various data streams, such as building sensor data 600 but also device telemetry data such as heartbeats and logs. The API facilities log any issues as well as communicate with other APIs and the devices over the IoT hub (eg., event hub 802, FIG. 8) to attempt self-healing. Some implementations can create two cloud services; one for the API and another for the worker role which will process data.

The API can hook into various logging mechanisms like App Insights to log and alert on various system states. The API can also wrap various IoT hub communications with IoT gateways 110, to trigger jobs such as updates and restart. The algorithm below can provide an example of alert processing of device heartbeats which notifies if a device unexpectedly goes offline.

```
public class AlertHandlingManager : IAlertHandlingManager
{
    private IDeviceManager _deviceManager;
    private IAlertNotificationManager _alertNotificationManager;
    public AlertHandlingManager(IDeviceManager
deviceManager, IAlertNotificationManager alertNotificationManager)
    {
        this._deviceManager = deviceManager;
        this._alertNotificationManager = alertNotificationManager;
    }
    /// <summary>
    /// Take care of an alert for a device which missed a heartbeat
    /// </summary>
    /// <param name="alert">The alert to take care of</param>
    /// <returns></returns>
    public async Task HandleMissedDeviceHeartbeat(Alert alert)
    {
        try
        {
            Device device = await
this._deviceManager.GetDevice(alert.Id);
            if (device.ExpectedStatus ==
Data.DataModel.DeviceStatus.Off ||
                device.ExpectedStatus ==
Data.DataModel.DeviceStatus.Maintenance)
            {
                if (device.ActualStatus != device.ExpectedStatus)
                {
                    device.ActualStatus = device.ExpectedStatus;
                    await
this._deviceManager.AddOrUpdateDevice(device);
                }
            }
            else
```

```
            {
                device.ActualStatus =
Data.DataModel.DeviceStatus.Error;
                await
this._deviceManager.AddOrUpdateDevice(device);
                await
this._alertNotificationManager.SendAlertToAdmin(alert);
            }
        }
        catch (Exception ex) { }
    }
    public Task HandleDeviceTurnedOn(Alert alert)
    {
        Device device = new Device( )
        {
            ActualStatus = Data.DataModel.DeviceStatus.On,
            ExpectedStatus = Data.DataModel.DeviceStatus.On,
            Id = alert.Id,
        };
        object ip;
        if(alert.Properties.TryGetValue("IP", out ip))
        {
            device.IP = ip.ToString( );
        }
        return this._deviceManager.AddOrUpdateDevice(device);
    }
}
```

The worker role can use the same sensor processing engine (e.g., processor 806, FIG. 8) to ingest health metric data, running different sets of processors to gather information about the state of the system.

The notification service can be viewed as notification API (908, FIG. 9), in which a client can subscribe to a given set of data points. This can be direct sensor data or can be some aggregation for a given space. Data can be pushed to devices only when it (e.g., the data) changes. In addition to sensor data 600, predications based on machine learning and data from other systems such as conference room booking status, or user status can be pushed to clients.

One implementation can utilize the physical enterprise management cloud service 112 to host the notification API 908. The notification API can consist of two main endpoints. One is a REST controller which can allow for triggering a notification and getting the latest data. This is called by the processor (806, FIG. 8) when data has changed. The second is a SignalR Hub which can allow clients to subscribe to data streams. This can be very granular, from a per sensor feed, to a per space feed broken down by data type. This enables clients to just be notified about the data they need. An example SignalR Hub algorithm is shown below.

```
public class SensorHub : Hub
{
    private ISensorCacheManager _sensorCacheManager;
    private ManagementAPIClient _managementAPIClient;
    private Logger _sensorDataLogger;
    public SensorHub(ISensorCacheManager
sensorCacheManager) : base( )
    {
        _sensorCacheManager = sensorCacheManager;
        _managementAPIClient = new ManagementAPIClient( );
        _sensorDataLogger = new Logger( );
    }
    public void multipleJoinGroup(Dictionary<string,List<string>>
spaceIdMap)
    {
        ConcurrentDictionary<string, ConcurrentDictionary<string,
string>> spaceIDtoAverageMapping = new ConcurrentDictionary<string,
ConcurrentDictionary<string, string>>( );
        Parallel.ForEach(spaceIdMap, (KeyValuePair<string,
```

-continued

```
List<string>> spaceId) =>
    {
        ConcurrentDictionary<string, string> spaceAverages =
OnConnectionSpaceIDValues(Guid.Parse(spaceId.Key),
spaceId.Value);
        spaceIDtoAverageMapping.TryAdd(spaceId.Key,
spaceAverages);
    });
Clients.Caller.OnConnectingMultipleSpaceIDs(spaceIDtoAverageMappi
ng);
    }
    public void multipleJoinGroup(List<string> spaceIDList,
List<string> sensorType)
    {
        Dictionary<string, List<string>> spaceIdMap = new
Dictionary<string, List<string>>( );
        foreach(string spaceId in spaceIDList)
        {
          try {
            spaceIdMap.Add(spaceId, sensorType);
          }
          catch(Exception ex)
          {
            //Duplicate Ids were requested ignoring the repeated
values
          }
        }
        multipleJoinGroup(spaceIdMap);
    }
    public ConcurrentDictionary<string, string>
OnConnectionSpaceIDValues(Guid spaceID, List<string> sensorType)
    {
        ConcurrentDictionary<string, string> averages = new
ConcurrentDictionary<string, string>( );
        var enumList = sensorType.Select((x) =>
(SensorDataTypeEnum)Enum.Parse(typeof(SensorDataTypeEnum),x));
        Parallel.ForEach(enumList, (type) =>
        {
            Groups.Add(Context.ConnectionId, (spaceID + "_" +
type));
            averages.TryAdd(type.ToString( ),
_sensorCacheManager.GetEntityNotificationValue(spaceID, type,
int.MaxValue));
        });
        return averages;
    }
}
```

In some implementations a client can pass up a list of IDs and data types it cares about. Recent data (such as from the redistribution cache 906, FIG. 9) can be returned along with subscribing the client to the proper groups to receive further notifications.

Client services can provide any additional features/abstractions for downstream services specific to various client applications. For instance, client services can host the workplace API. The Workplace API can provide the abstraction and integration with various enterprise services such as EWS, Yammer, and/or facilities services, among others. This integration can allow clients to reserve conference rooms, view Yammer feeds, book shuttles, and/or view café menus, among others.

Client services can provide new client experience capabilities developed around IoT sensors. One client experience is manifest as OurBlock, which is the main client experience that ties together both the enterprise services provided by the workplace API and the data streams provided by the Notification API (908, FIG. 9). OurBlock is an example client application that can allow users in a workspace to view and interact with the IoT data collected by the sensors 108. Workplace API is an example of a service that can interact with other Enterprise services such as Exchange free/busy data and Skype for Business status of users among other things.

The client experience can consist of a website which powers the map where sensor data 600 is displayed, and a wrapper graphical windows application that ties in the enterprise services. One implementation can include using the physical environment management cloud service 112 to host a client map API. The client map can use GeoJSON processed floorplans in a javascript mapping control Leaflet, for example. The floorplans can link to space IDs in the system and have layers which expose occupancy, sound, and/or temperature data, among others. Example maps are shown in FIGS. 11A and 11B.

Client libraries, such as SignalR javascript client libraries, can be used to subscribe to the data feeds above and update the map on data changes, coloring rooms or updating values.

The algorithm below shows a sample of connection to the notification API.

```
var connection = $.hubConnection(signalrURL, { useDefaultPath:
false });
    var sensorHubProxy = connection.createHubProxy('sensorHub');
    connection.start( )
        .done(function ( ) {
            //pass down the sensorTypeList once the new azureiot-
notifications service is deployed
            if (hasSoundData.toUpperCase( ) == "TRUE") {
                var sensorTypeList = ["Motion", "Temperature",
"Sound"];
            }
            else {
                var sensorTypeList = ["Motion", "Temperature"];
            }
            //Join multiple SpaceIDs at once. This is to get the sensor
data at one go on initial load.
            sensorHubProxy.invoke('multipleJoinGroup', spaceID,
sensorTypeList); //pass in sensorTypeList once new service is deployed
        })
        .fail(function ( ) {
            SensorMap = [ ];
            //To add error page here
            var index = 0;
            for (index = 0; index < spaceID.length; ++index) {
                var SensorMapObj = { };
                SensorMapObj["SensorId"] =
SpaceIDtoFPIDMapping[spaceID[index]];
                SensorMapObj["Motion"] = undefined;
                SensorMapObj["Sound"] = undefined;
                SensorMapObj["Temperature"] = undefined;
                SensorMap.push(SensorMapObj);
                MotionInRooms[SensorMapObj["SensorId"]] =
undefined;
            }
            paintMap(FreeConferenceRooms);
        });
An example algorithm for handling sensor data updates is
provided below.
    sensorHubProxy.on('NotifySpaceSensorAverageChange',
function (newValue) {
        if (newValue.SensorType == 1) {
            var i = 0;
            for (i = 0; i < SensorMap.length; i++) {
                if (SensorMap[i]["SensorId"] ==
SpaceIDtoFPIDMapping[newValue.SpaceID]) {
                    SensorMap[i]["Motion"] = newValue.NewValue;
MotionInRooms[SpaceIDtoFPIDMapping[newValue.SpaceID]] =
newValue.NewValue;
                }
            }
            paintMap(FreeConferenceRooms);
        }
        else if (newValue.SensorType == 2) {
            var i = 0;
            for (i = 0; i < SensorMap.length; i++) {
                if (SensorMap[i]["SensorId"] ==
SpaceIDtoFPIDMapping[newValue.SpaceID]) {
                    if (newValue.NewValue == undefined ||
newValue.NewValue.toUpperCase( ) == "ERROR") {
                        SensorMap[i]["Temperature"] = "ERROR";
```

-continued

```
            paintMap(FreeConferenceRooms);
            break;
        }
        else if (isCelsiusReqd.toUpperCase( ) == "TRUE") {
            if (SensorMap[i]["Temperature"] ==
Math.round((eval("(" + newValue.NewValue + ")") - 32) /
1.8).toString( ))
                break;
            else {
                SensorMap[i]["Temperature"] =
Math.round((eval("(" + newValue.NewValue + ")") - 32) /
1.8).toString( );
                paintMap(FreeConferenceRooms);
                break;
            }
        }
        else {
            if (SensorMap[i]["Temperature"] ==
newValue.NewValue.split('.')[0]) {
                break;
            }
            else {
                SensorMap[i]["Temperature"] =
newValue.NewValue.split('.')[0];
                paintMap(FreeConferenceRooms);
                break;
            }
        }
    }
    else if (newValue.SensorType == 4) {
        var i = 0;
        for (i = 0; i < SensorMap.length; i++) {
            if (SensorMap[i]["SensorId"] ==
SpaceIDtoFPIDMapping[newValue.SpaceID]) {
                SensorMap[i]["Sound"] = newValue.NewValue;
            }
        }
        paintMap(FreeConferenceRooms);
    }
    try {
        sensorHubProxy.invoke('SensorNotificationCallBack',
appInsights.context.user.id, newValue.TransactionId,
newValue.NewValue, newValue.SpaceID);
    }
    catch (err) {
        appInsights.trackException('SignalR sensorcallback', err);
    }
});
```

The workplace API can be used in the map to allow reserving rooms, and/or viewing conference room information. The graphical application (which can be made available for Windows, iOS, Android and other operating systems) can wrap the client map in a web view and overlay controls which interact with shuttles, campus events, café menus, Skype status, and/or Yammer Feeds, among others. The workplace API can operate both on users' computers and phones (e.g., client device 116, FIG. 1), and/or also in a Kiosk mode large display setting in an area of interest, such as a building.

The workplace API can include new facilities reporting mechanisms based on IoT sensors 108. For instance, the admin dashboard is the administrator experience, and can allow for administration of the system, metadata, and/or can also expose insights using various reporting logic on existing data to deliver facilities worker value. For instance, such a solution can create a cloud service to host the dashboard. The dashboard can consist of an API/MVC app to display data in a more facilities orientated way and allow for metadata entry to create new spaces, devices and sensors. The worker role can process historical data and generate reports that provide insight to facilities use and state over time.

Figure 13:
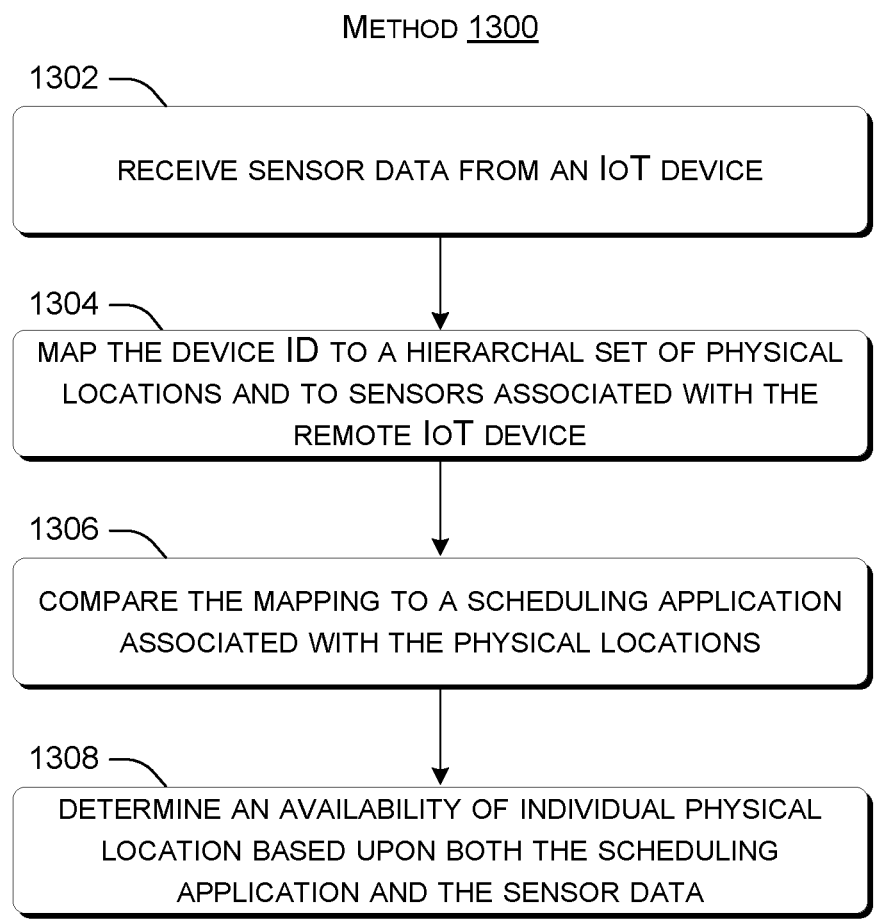
FIGS. 13-15 are example flow charts of various IoT aspects in accordance with some implementations of the present concepts.

FIG. 13 shows an example method 1300.

At block 1302, the method can receive sensor data from an IoT device or IoT gateway.

At block 1304, the method can map the device ID to a hierarchal set of physical locations and to sensors associated with the remote IoT device.

At block 1306, the method can compare the mapping to a scheduling application associated with the physical locations.

At block 1308, the method can determine an availability of individual physical location based upon both the scheduling application and the sensor data.

An alternative method can involve visually reporting environmental data collected by sensors overlaid on a floorplan to provide a data visualization view. An example of an output of such a method is shown and described relative to FIG. 11B.

Figure 14:
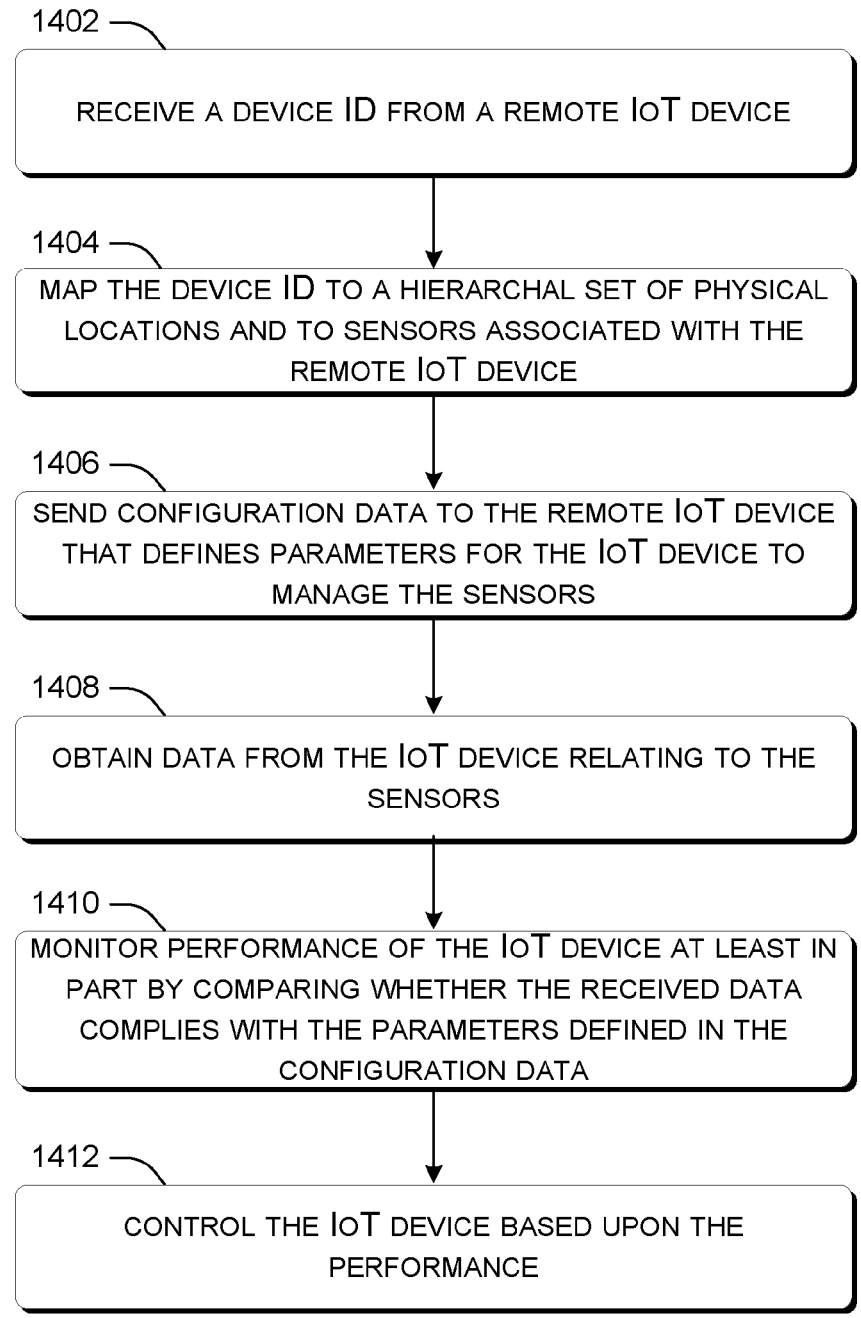

FIG. 14 shows another method 1400.

At block 1402, the method can receive a device ID from a remote IoT device.

At block 1404, the method can map the device ID to a hierarchal set of physical locations and to sensors associated with the remote IoT device.

At block 1406, the method can send configuration data to the remote IoT device that defines parameters for the IoT device to manage the sensors.

At block 1408, the method can obtain data from the IoT device relating to the sensors.

At block 1410, the method can monitor performance of the IoT device at least in part by comparing whether the received data complies with the parameters defined in the configuration data.

At block 1412, the method can control the IoT device based upon the performance.

Figure 15:
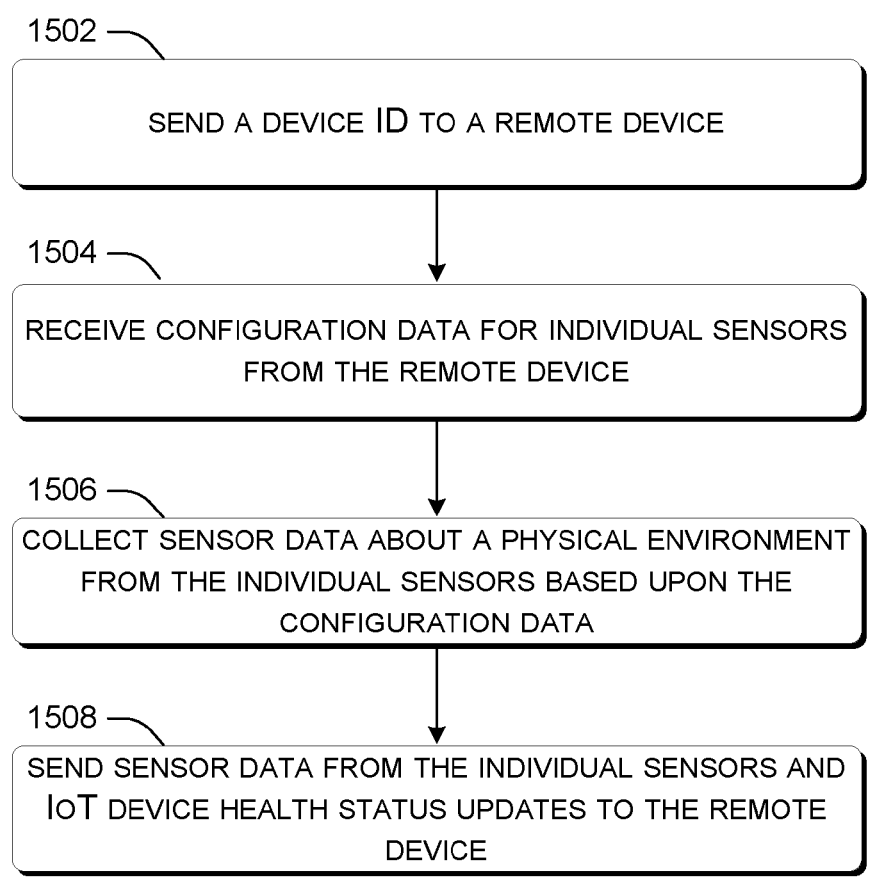

FIG. 15 shows another method.

At block 1502, the method can send a device ID to a remote device, such as a cloud-based resource.

At block 1504, the method can receive configuration data for individual sensors from the remote device. The configuration data can include individual ports that the individual sensors are coupled to and polling rates for the individual sensors.

At block 1506, the method can collect sensor data about a physical environment from the individual sensors based upon the configuration data.

At block 1508, the method can send sensor data from the individual sensors and IoT device health status updates to the remote device.

Method implementations can be performed by the systems and/or devices described above, and/or by other devices and/or systems. The order in which the methods are described is not intended to be construed as a limitation, and any number of the described acts can be combined in any order to implement the method, or an alternate method. Furthermore, the method can be implemented in any suitable hardware, software, firmware, or combination thereof, such that a device can implement the method. In one case, the method is stored on computer-readable storage media as a set of instructions such that execution by a processor of a computing device causes the computing device to perform the method.

The term "device," "computer," "computing device" or "IoT gateway device" as used herein can mean any type of device that has some amount of processing capability and/or storage capability. Processing capability can be provided by one or more processors that can execute data in the form of computer-readable instructions to provide a functionality.

Data, such as computer-readable instructions and/or user-related data, can be stored on storage, such as storage that can be internal or external to the device. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

Examples of devices can include traditional computing devices, such as personal computers, desktop computers, notebook computers, cell phones, smart phones, personal digital assistants, pad type computers, mobile computers, cameras, appliances, smart devices, IoT devices, etc. and/or any of a myriad of ever-evolving or yet to be developed types of computing devices.

Devices can be implemented as an application/operating system/hardware configuration and/or as a system on a chip (SOC) type design. In such a case, functionality provided by the device can be integrated on a single SOC or multiple coupled SOCs. One or more processors can be configured to coordinate with shared resources, such as memory/storage, etc., and/or one or more dedicated resources, such as hardware blocks configured to perform certain specific functionality. Thus, the term "processor" as used herein can also refer to central processing units (CPUs), graphical processing units (GPUs), controllers, microcontrollers, processor cores, or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

Various device examples are described above. Additional examples are described below. One example includes a system comprising a device that includes a processor and storage. The system further comprises multiple sensors of different sensor types linked to the device and computer-readable instructions stored on storage. When executed by the processor, the computer-readable instructions send a device ID to a remote device and receive configuration data for individual sensors from the remote device. The configuration data includes individual ports that the individual sensors are coupled to and polling rates for the individual sensors. The computer-readable instructions further collect sensor data about a physical environment from the individual sensors based upon the configuration data and send sensor data from the individual sensors and IoT device health status updates to the remote device.

Another example can include any of the above and/or below examples where the remote device comprises a cloud-based remote device that provides a sensor processing system for the physical environment.

Another example can include a system comprising a device that includes a processor and storage. The system further comprises computer-readable instructions stored on the storage and when executed by the processor are operable to receive a device identification (ID) from a remote internet of things (IoT) device, map the device ID to a hierarchal set of physical locations and to sensors associated with the remote IoT device, send configuration data to the remote IoT device that defines parameters for the remote IoT device to manage the sensors, and obtain data from the remote IoT device relating to the sensors. The system further comprises computer-readable instructions stored on the storage and when executed by the processor operable to monitor performance of the remote IoT device at least in part by comparing whether the obtained data complies with the parameters defined in the configuration data and further controls the remote IoT device based upon the performance.

Another example can include any of the above and/or below examples where the parameters relate to polling rate and port.

Another example can include any of the above and/or below examples where the controlling comprises comparing the IoT device to other IoT devices, restarting and/or sending updates to the IoT device.

Another example can include a method comprising receiving sensor data from a remote IoT device having a device ID, mapping the device ID to a hierarchal set of physical locations and to sensors associated with the remote IoT device, comparing the mapping to a scheduling application associated with the physical locations, and determining an availability of individual physical location based upon both the scheduling application and the sensor data.

Another example can include any of the above and/or below examples where the method further comprises causing a representation to be generated that shows both sensor data and scheduling data.

Another example can include any of the above and/or below examples where the method further comprises predicting a future state of the individual physical location.

Another example can include a system comprising a sensor array assembly comprising an enclosure and a mounting element. The mounting element comprises multiple apertures spaced at different distances from the enclosure. The sensor array assembly further comprises a connector that is receivable by individual apertures to accommodate an individual substrate thickness to secure the mounting element.

Another example can include any of the above and/or below examples where the connector comprises a slipstick stick.

Another example can include any of the above and/or below examples where the system further comprises a sensor array foot plate positioned within the enclosure and where multiple sensors are positioned on the sensor array foot plate.

Another example can include any of the above and/or below examples where the sensor array foot plate is shaped to receive the multiple sensors.

Another example can include any of the above and/or below examples where the sensor array foot plate comprises a modular sensor sub-assembly that is readily physically and electrically connectable and disconnectable from the enclosure.

Another example can include any of the above and/or below examples where the modular sensor sub-assembly is readily physically and electrically connectable and disconnectable from the enclosure via a removable attachment element.

Another example can include any of the above and/or below examples where the removable attachment element comprises magnets that electrically couple the multiple sensors to the sensor array assembly and physically couple the removable attachment element to the enclosure.

Another example can include any of the above and/or below examples where the removable attachment element comprises conductive sensor pads that electrically couple the multiple sensors to the sensor array assembly and Velcro that physically couples the removable attachment element to the enclosure.

Another example can include any of the above and/or below examples where the system further comprises an IoT gateway device that is configured to be communicatively coupled to multiple sensors of the sensor array.

Another example can include any of the above and/or below examples where the IoT gateway device is contained in the enclosure.

Another example can include any of the above and/or below examples where IoT gateway device is contained in a different enclosure that is distinct from the enclosure.

Another example can include any of the above and/or below examples where the IoT gateway device is communicatively coupled to the multiple sensors with physical conductors or wirelessly.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A system, comprising:
  a device comprising a processor and storage;
  multiple sensors of different sensor types linked to the device via multiple ports, the multiple sensors including one or more low-energy short-range wireless sensors; and
  computer-readable instructions stored on the storage which, when executed by the processor, cause the processor to:
    upon bootup of the system, send a device identification to a cloud service and a request to the cloud service to determine a configuration of the system;
    responsive to the request sent upon bootup of the system, receive configuration data for individual sensors from the cloud service, wherein the configuration data identifies individual ports of the system that the individual sensors are coupled to and sensor types for the individual sensors;
    collect sensor data about a physical environment from the individual sensors based at least upon the configuration data; and,
    send the sensor data and Internet of Things device health status updates to the cloud service, the sensor data including low-energy short-range wireless sensor data sensed by the one or more low-energy short-range wireless sensors, the low-energy short-range wireless sensor data reflecting a low-energy short-range wireless signal emitted by a wireless beacon.

2. The system of claim 1, wherein the cloud service comprises a cloud-based remote device that provides a sensor processing system for the physical environment.

3. The system of claim 1, wherein the computer-readable instructions, when executed by the processor, cause the processor to:
  generate the request using a representational state transfer call.

4. The system of claim 1, wherein the computer-readable instructions, when executed by the processor, cause the processor to:
  collect the sensor data at different polling rates for at least two different sensors, as specified by the configuration data.

5. The system of claim 1, wherein the multiple sensors include a sound sensor, a motion sensor, a temperature sensor, a light sensor, and an air quality sensor.

6. The system of claim 1, wherein the device is an embedded device having an embedded operating system.

7. The system of claim 6, wherein the computer-readable instructions comprise embedded firmware.

8. The system of claim 7, wherein the embedded firmware, when executed by the processor, causes the processor to:
  report processor load, memory utilization, and storage utilization to the cloud service.

9. The system of claim 7, wherein the embedded firmware, when executed by the processor, causes the processor to:
  for a first sensor:
    identify, in the configuration data, a first physical port of the system to which the first sensor is connected, a first communication protocol to use for the first sensor, and a first polling rate at which to poll the first sensor; and
    poll the first sensor over the first physical port at the first polling rate using the first communication protocol; and
  for a second sensor:
    identify, in the configuration data, a second physical port of the system to which the second sensor is connected, a second communication protocol to use for the second sensor, and a second polling rate at which to poll the second sensor; and
    poll the second sensor over the second physical port at the second polling rate using the second communication protocol,
  wherein the first sensor is a different type of sensor than the second sensor, the first communication protocol is different than the second communication protocol, and the first polling rate is different than the second polling rate.

10. The system of claim 7, wherein the embedded firmware, when executed by the processor, causes the processor to:
  periodically communicate a heartbeat ping to the cloud service.

11. A method comprising:
  upon bootup of a system, sending a device identification to a cloud service and a request to the cloud service to determine a configuration of the system;
  responsive to the request sent upon bootup of the system, receiving configuration data for multiple sensors from the cloud service, wherein the configuration data identifies individual ports of the system that individual sensors are coupled to and sensor types for the individual sensors, the multiple sensors including one or more low-energy short-range wireless sensors;

collecting sensor data about a physical environment from the individual sensors based at least upon the configuration data; and, sending the sensor data and Internet of Things device health status updates to the cloud service, the sensor data including low-energy short-range wireless sensor data sensed by the one or more low-energy short-range wireless sensors, the low-energy short-range wireless sensor data reflecting a low-energy short-range wireless signal emitted by a wireless beacon.

12. The method of claim 11, wherein the cloud service comprises a cloud-based remote device that provides a sensor processing system for the physical environment.

13. The method of claim 11, wherein the multiple sensors include at least one of a sound sensor, a motion sensor, a temperature sensor, a light sensor, or an air quality sensor.

14. The method of claim 11, performed by an Internet of Things device and wherein the multiple sensors comprise Internet of Things sensors.

15. The method of claim 11, performed by an embedded operating system of an embedded device.

16. The method of claim 15, performed by executing embedded firmware.

17. The method of claim 11, further comprising: reporting at least two of processor load, memory utilization, and storage utilization of the system to the cloud service.

18. The method of claim 11, further comprising: polling different sensors at different polling rates as specified by the configuration data received from the cloud service.

19. The method of claim 11, further comprising: periodically communicating a heartbeat ping to the cloud service.

20. A hardware computer-readable storage media storing a set of instructions which, when executed by a processor of a computing device, cause the computing device to perform operations comprising:

upon bootup of a system, sending a device identification to a cloud service and a request to the cloud service to determine a configuration of the system;

responsive to the request sent upon bootup of the system, receiving configuration data for multiple sensors from the cloud service, wherein the configuration data identifies individual ports of the system that individual sensors are coupled to and sensor types for the individual sensors, the multiple sensors including one or more low-energy short-range wireless sensors;

collecting sensor data about a physical environment from the individual sensors based at least upon the configuration data; and, sending the sensor data and Internet of Things device health status updates to the cloud service, the sensor data including low-energy short-range wireless sensor data sensed by the one or more low-energy short-range wireless sensors, the low-energy short-range wireless sensor data reflecting a low-energy short-range wireless signal emitted by a wireless beacon.

* * * * *